(12) United States Patent
Christodorescu et al.

(10) Patent No.: US 12,328,387 B2
(45) Date of Patent: Jun. 10, 2025

(54) DYNAMIC PRIVACY-PRESERVING APPLICATION AUTHENTICATION

(71) Applicant: Visa International Service Association, San Francosco, CA (US)

(72) Inventors: Mihai Christodorescu, San Francisco, CA (US); Maliheh Shirvanian, San Francisco, CA (US); D. M. Shams Zawoad, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 290 days.

(21) Appl. No.: 18/023,971

(22) PCT Filed: Sep. 2, 2021

(86) PCT No.: PCT/US2021/048822
§ 371 (c)(1),
(2) Date: Feb. 28, 2023

(87) PCT Pub. No.: WO2022/051463
PCT Pub. Date: Mar. 10, 2022

(65) Prior Publication Data
US 2023/0246820 A1    Aug. 3, 2023

Related U.S. Application Data

(60) Provisional application No. 63/074,355, filed on Sep. 3, 2020.

(51) Int. Cl.
*H04L 9/08* (2006.01)
*H04L 9/30* (2006.01)
(52) U.S. Cl.
CPC .......... *H04L 9/0825* (2013.01); *H04L 9/0894* (2013.01); *H04L 9/3026* (2013.01)

(58) Field of Classification Search
CPC .... H04L 9/0825; H04L 9/0894; H04L 9/3026
See application file for complete search history.

(56) References Cited

U.S. PATENT DOCUMENTS 8,965,066 B1 *   2/2015  Derakhshani ........ G06V 40/193
                                                        382/209
10,826,686 B1 * 11/2020  Cho .................... H04L 63/0861
(Continued)

FOREIGN PATENT DOCUMENTS

EP          3627796 A1    3/2020
WO       2010031142 A1    3/2010

OTHER PUBLICATIONS

Application No. EP21865091.9, Extended European Search Report, Mailed On Jan. 30, 2024, 9 pages.
(Continued)

*Primary Examiner* — Gary S Gracia
(74) *Attorney, Agent, or Firm* — Kilpatrick Townsend & Stockton LLP

(57) ABSTRACT

An application or device is authenticated using secure application data validation. A server computer receives an authentication request comprising an application identifier or a user device identifier associated with a user device, the authentication request originating from the user device. The server computer receives a set of behavioral data associated with the application or the user device. Responsive to receiving the application identifier or device identifier, the server computer obtains a fuzzy vault associated with the application identifier or the user device identifier. The server computer determines a reconstructed key value using the fuzzy vault and the set of behavioral data. The application or the user device is authenticated using the reconstructed key value.

18 Claims, 11 Drawing Sheets

(56) References Cited

U.S. PATENT DOCUMENTS

| | | | |
|---|---|---|---|
| 11,321,445 B2* | 5/2022 | Arora | G06F 21/45 |
| 11,451,385 B2* | 9/2022 | Herder, III | H04L 9/3239 |
| 2015/0074407 A1 | 3/2015 | Palmeri et al. | |
| 2015/0095654 A1* | 4/2015 | Li | H04L 9/0866 713/186 |
| 2015/0304101 A1* | 10/2015 | Gupta | H04L 9/0866 380/28 |
| 2016/0173455 A1* | 6/2016 | Ramachandra Rao | H04L 63/0861 713/168 |
| 2019/0028892 A1* | 1/2019 | Henry | H04L 9/14 |
| 2019/0058702 A1* | 2/2019 | Kurian | H04L 63/205 |
| 2019/0058992 A1* | 2/2019 | Kurian | H04W 12/06 |
| 2019/0163890 A1* | 5/2019 | Cho | G06F 21/40 |
| 2019/0377853 A1* | 12/2019 | Obaidi | G06F 21/32 |
| 2019/0384956 A1 | 12/2019 | Whelan et al. | |
| 2020/0244451 A1* | 7/2020 | Herder, III | H04L 9/0894 |
| 2020/0296093 A1* | 9/2020 | Hoyos | H04L 9/3247 |
| 2020/0335107 A1* | 10/2020 | Hahn | G06F 21/6245 |
| 2021/0097166 A1* | 4/2021 | Arora | G06F 21/32 |
| 2023/0246820 A1* | 8/2023 | Christodorescu | H04L 9/0894 713/171 |

OTHER PUBLICATIONS

Juels et al., "A Fuzzy Vault Scheme", Institute of Electrical and Electronics Engineers International Symposium on Information Theory, Jan. 1, 2002, 18 pages.

Valsesia et al., "User Authentication via PRNU-Based Physical Unclonable Functions", Institute of Electrical and Electronics Engineers Transactions on Information Forensics and Security, vol. 12 No. 8, Aug. 2017, pp. 1941-1956.

Application No. PCT/US2021/048822, International Search Report and Written Opinion, mailed On Dec. 17, 2021, 11 pages.

Examination Report, Communication pursuant to Article 94(3) EPC, dated Feb. 6, 2025, for European Patent Application No. 21 865 091.9, 5 pages.

* cited by examiner

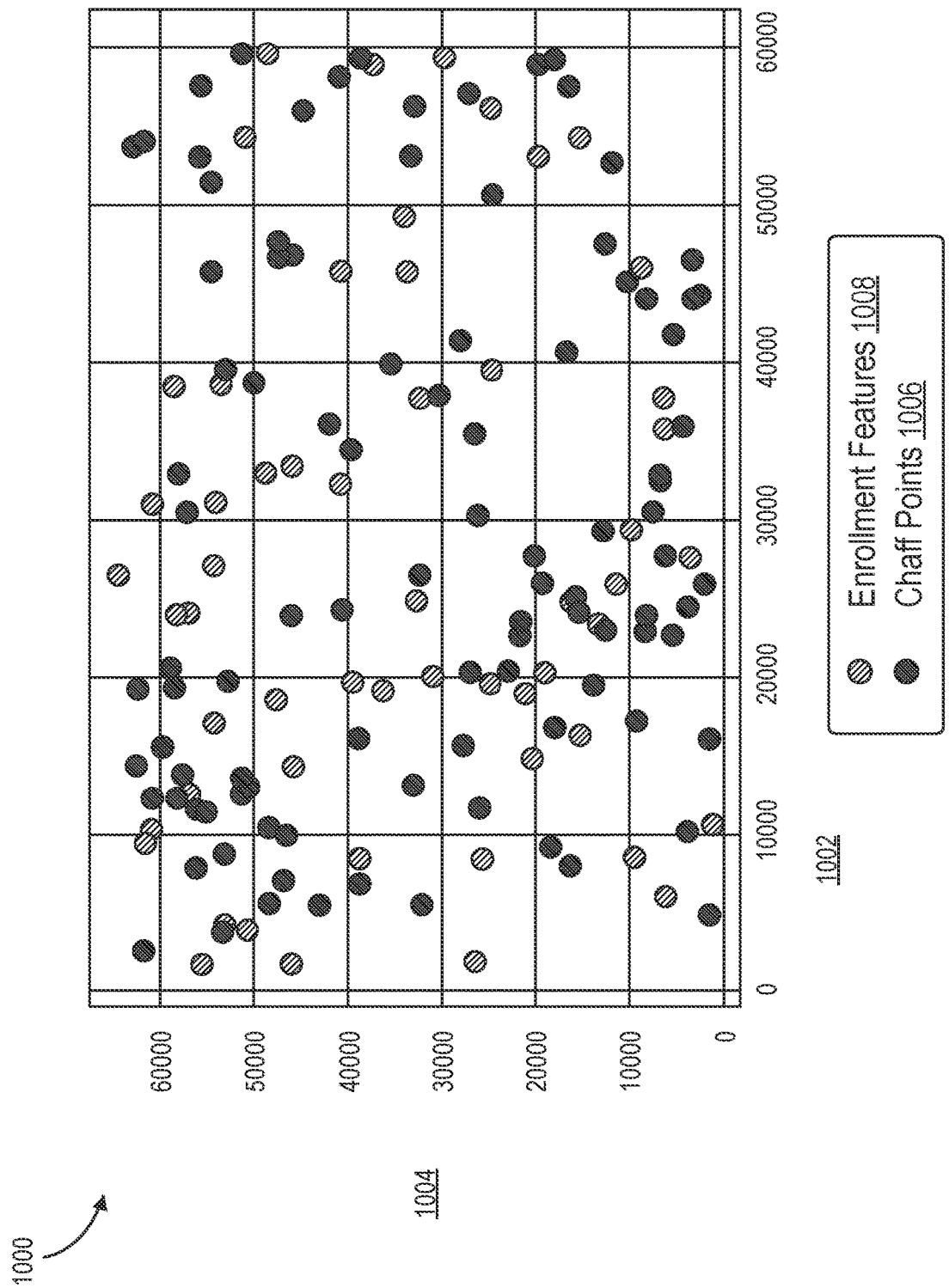

DYNAMIC PRIVACY-PRESERVING APPLICATION AUTHENTICATION

CROSS-REFERENCE TO RELATED APPLICATIONS

This is a US National Phase application of the International Application No. PCT/US2021/048822, filed Sep. 2, 2021, which claims benefit of priority of U.S. Provisional Application No. 63/074,355, filed Sep. 3, 2020, the entirety of which are incorporated herein by reference for all purposes.

BACKGROUND

Applications and devices in a client-server setting commonly authenticate using a credential. Managing credentials in a secure way is challenging and centralized solutions can become a single point of failure. Application authentication is typically performed using some form of credentials such as passwords and cryptographic keys. Since the client applications and devices are responsible for securely storing and managing the credentials, this approach is vulnerable to attacks on clients. A centrally managed credential storage is also susceptible to various attacks and, if compromised, can leak the secret credentials.

Embodiments address these and other problems, individually and collectively.

SUMMARY

In some embodiments, improved techniques for authenticating an application or device are provided The security and privacy of authentication is improved by using a fuzzy vault to store an authentication key that is locked with application or device behavioral data. The behavior of the application or device is monitored and used to securely store the key in the fuzzy vault. The key can be retrieved and validated to authenticate an application or device upon comparing behavioral data collected in association with the application or device to the data stored in the fuzzy vault.

In some embodiments, a computer-implemented method includes receiving, by a server computer, an authentication request comprising an application identifier associated with an application or a user device identifier associated with a user device, the authentication request originating from the user device; receiving, by the server computer, a set of behavioral data associated with the application or the user device; responsive to receiving the application identifier or device identifier, obtaining, by the server computer, a fuzzy vault associated with the application identifier or the user device identifier; and determining, by the server computer, a reconstructed key value using the fuzzy vault and the set of behavioral data, wherein the application or the user device is authenticated using the reconstructed key value.

In some aspects, the server computer is a fuzzy extractor server computer and the fuzzy vault is stored in an authentication server computer, and the method further includes generating, by the fuzzy extractor server computer, a hash of the reconstructed key value; and transmitting, by the fuzzy extractor server computer, the hash of the reconstructed key value and the application identifier or the user device identifier to the authentication server computer, wherein the authentication server computer verifies the hash of the reconstructed key value with a hash of an enrollment key value, and wherein the authentication server computer notifies the user device that the user device or the application is authenticated.

In some aspects, the set of behavioral data is obtained from a plurality of sensors in communication with or within the user device. In some aspects, the set of behavioral data includes one or more of: CPU consumption by the application or the user device, memory consumption by the application or the user device, a number of successful communications with the application or the user device, a number of files accessed by the application or the user device, a number of system calls performed by the application or the user device, an average response time of the application or the user device, a number of packets sent by the application or the user device, or a number of packets received by the application or the user device. In some aspects, the server computer is a fuzzy extractor server computer and the fuzzy vault is stored in an authentication server computer, and the fuzzy extractor server computer receives the authentication request from the user device via the authentication server computer.

In some aspects, determining, by the server computer, the reconstructed key value using the fuzzy vault and the set of behavioral data comprises: using the behavioral data to identify a candidate set of points in the fuzzy vault; forming a polynomial with the candidate set of points; and determining the reconstructed key value using coefficients of the polynomial. In some aspects, using the behavioral data to identify the candidate set of points in the fuzzy vault comprises: for each feature value of the plurality of feature values, comparing the feature value to a fuzzy vault value corresponding to a point in the fuzzy vault; and selecting, as one of the candidate set of points, the point in the fuzzy vault if the fuzzy vault value is within a predetermined threshold of the one of the feature value.

In some aspects, the server computer is a fuzzy extractor server computer and the fuzzy vault is stored in an authentication server computer, and the fuzzy extractor server computer receives the fuzzy vault from the user device via the authentication server computer along with the user device identifier or the user device identifier.

In some aspects, the set of behavioral data is a first set of behavioral data, and the method further comprises an enrollment process, the enrollment process including: receiving, by the server computer, an enrollment request comprising the application identifier or the user device identifier and an enrollment key value; receiving, by the server computer, a second set of behavioral data associated with the user device or the application; forming, by the server computer, a polynomial using the enrollment key value, wherein one or more portions of the enrollment key value form coefficients of the polynomial; determining, by the server computer, a set of genuine points by inputting the second set of behavioral data into the polynomial; and forming the fuzzy vault using the set of genuine points and random chaff points.

In some aspects, the fuzzy vault comprises the set of genuine points and the random chaff points on a graph. In some aspects, the method further comprises transmitting the fuzzy vault to the user device, wherein the user device stores the fuzzy vault. In some aspects, the method further comprises deleting, by the server computer, the enrollment key value after forming the fuzzy vault. In some aspects, the server computer is a fuzzy extractor server computer and the enrollment key value is generated by an authentication server computer, and is hashed by the authentication server computer, and the hashed enrollment key is stored by the authentication server computer.

In some aspects, receiving, by the server computer, the set of behavioral data associated with the application or the user device comprises receiving the set of behavioral data associated with the user device. In some aspects, receiving, by the server computer, the set of behavioral data associated with the application or the user device comprises receiving the set of behavioral data associated with the application. In some aspects, the application or the user device is granted access to a computing service based on the authentication.

In some aspects, the set of behavioral data comprises time series data, and the method further comprises computing a statistical value based on the time series data for at least a subset of the behavioral data, wherein the statistical value is used to determine the reconstructed key value. In some aspects, the set of behavioral data comprises a plurality of feature values, and the method further comprises computing a normalized value for each of the feature values. In some aspects, the method further comprises generating a binary feature vector based on the normalized values, wherein the binary feature vector is used to determine the reconstructed key value.

In some embodiments, a computer-implemented method includes transmitting, by an authentication server computer to a fuzzy extractor server computer, an authentication request for an application or a user device comprising an application identifier or a user device identifier associated with a user device, the authentication request originating from the user device, thereby causing computation of a reconstructed key value by the fuzzy extractor server computer using a fuzzy vault associated with the application identifier or the use device identifier and a set of behavioral data associated with the application or the user device; receiving the reconstructed key value or a hash of the reconstructed key value; and authenticating, by the authentication server computer, the application or the user device with the reconstructed key value or the hash of the reconstructed key value.

In some aspects, authenticating the application or the user device comprises: comparing, by the authentication server computer, the hash of the reconstructed key value to a stored hashed key; and determining, by the authentication server computer, that the hash of the reconstructed key value matches the stored hashed key. In some aspects, the method further comprises receiving, by the authentication server computer, the authentication request from the user device.

Embodiments further include computer systems and computer-readable media for performing the techniques described herein.

Terms

Prior to discussing specific embodiments, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may include suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "user device" may include any electronic device operable by a user. A user device may provide communication capabilities including communication over a mobile phone (wireless) network, wireless data network (e.g., 3G, 4G, or similar networks), Wi-Fi, Wi-Max, or any other communication medium that may provide access to a network such as the Internet or a private network. Examples of user devices include mobile phones (e.g., cellular phones), PDAs, tablet computers, net books, laptop computers, desktop computers, personal music players, hand-held specialized readers, wearable devices (e.g., watches), vehicles (e.g., cars), etc. A user device may comprise any suitable hardware and software for performing such functions, and may also include multiple devices or components (e.g., when a device has remote access to a network by tethering to another device—i.e., using the other device as a relay—both devices taken together may be considered a single user device).

A "fuzzy vault" or "fuzzy vault scheme" can be a method of providing secure authentication based on fuzzy matching of data sets. A fuzzy vault can be an encryption scheme which leverages some of the concepts of error correction codes, to encode information in such a way as to be difficult to obtain without the 'key' used to encode it, even if the methods used for encoding are publicly known. The encoded information may be in the form of a data vault. Fuzzy vaults are also described in A. Juels and M. Sudan, "A Fuzzy Vault Scheme," *Proc. IEEE Int'l. Symp. Inf. Theory*, A. Lapidoth and E. Teletar, Eds., pp. 408, 2002. and K. Nandakumar et al., "Fingerprint-based fuzzy vault: Implementation and performance," IEEE Transactions on Information Forensics and Security (December 2007).

A "data vault" may be a secure encoding of data. Data in a data vault may be secured in a form, such that the data can only be obtained with a correct key. A data vault may be encrypted data, and in some embodiments, the data vault may be formed using a fuzzy vault scheme.

A "hash" or "hash value" is a value (generally of fixed size) generated from data of arbitrary size (e.g., a string of text). A hash may be, for example, a numerical or string value. The hash may be significantly smaller than the data itself. A hash may be generated by a "hash function" such that it is extremely unlikely that some other data will produce the same hash value, and it is extremely difficult to reconstruct the data based on the hash value.

"Authentication data" may include any data suitable for proving that something is true and valid. Authentication data may be obtained from an application/device. Examples of authentication data obtained from a user may include authentication tokens, identifiers, passwords, etc. Examples of authentication data that may be obtained from a device may include device serial numbers, hardware security element identifiers, device fingerprints, phone numbers, IMEI numbers, templates stored on the device, etc.

A "credential" may include any suitable information that serves as reliable evidence of worth, ownership, identity or authority. A credential may be a string of numbers, letters, or any other suitable characters, or any object or document that can serve as confirmation. Examples of credentials include identification cards, certified documents, access cards, passcodes and other login information, payment account numbers, access badge numbers, payment tokens, access tokens, etc.

A "device code" or "device identifier" may include any code that is specifically associated with a device (e.g., only one device). The device code can be derived from any device specific information including, but not limited to include one or more of a secure element identifier (SE ID), an IMEI number, a phone number, a geo-location, a device serial number, a device fingerprint, etc. Such codes may be derived from such information using any suitable mathematical operation including hashing and/or encryption. Device codes may include any suitable number and/or type of characters.

A "feature" may include information characterizing an application or device. Each feature may correspond to a single property related to a client or client-to-server interaction. Each feature can be associated with a value at a given time that can be encoded into a numerical representation. While a set of features are unique and non-replicable over time, an individual feature might be same or similar among multiple applications or instances of the same application. Some examples of features include host-based features (e.g., average daily application CPU consumption), application audit trail-based features (e.g., number of successful connections per day), and network based features (e.g., number of unique URLs per day).

A "sensor" may include a device or component that collects values of features. A sensor can collect an instantaneous value of a feature associated with an application or device. Sensors can include firewalls, intrusion detection systems, operating system monitors, client application monitors, and server computers. Sensors may provide features values at a given time. In some cases, sensors may store or track a history of these values.

"Behavior" may refer to characteristic information about an entity. Behavior may correspond to a sequence of feature values gathered over time. Behavior can correspond to a set of unique and non-replicable features that over time can distinguish two different applications or two instances of the same applications running on the same or different hardware machines. Behavior can be considered as a set of current and past values of features over a duration time. In some cases, behavior corresponds to sequence of feature values from one execution of the application.

BRIEF DESCRIPTION OF THE DRAWINGS

FIG. 10 is a visualization of a fuzzy vault according to some embodiments.

DETAILED DESCRIPTION

Figure 1:
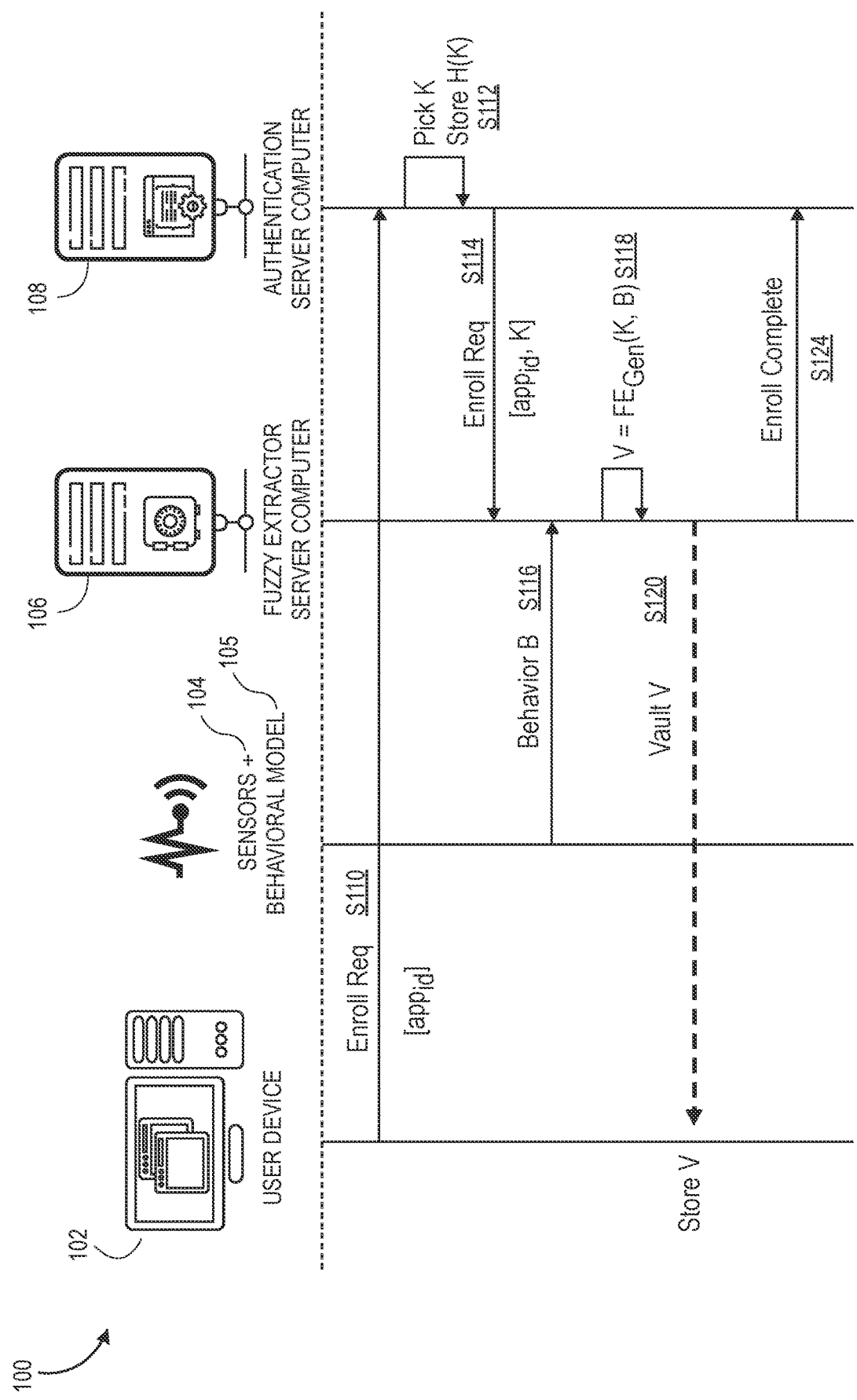
FIG. 1 illustrates an overview of a system and method for enrollment in an authentication service according to some embodiments.

Techniques for improved authentication of an application or a user device include generating a fuzzy vault to store an authentication key that is locked with behavioral data of the application or user device. The behavior of the application or user device is monitored and used to securely store the key in the fuzzy vault. The key can be retrieved and validated to authenticate the application or user device upon comparing behavioral data collected in association with the application or device to the data stored in the fuzzy vault.

Authentication of an application or device is typically performed using some form of credentials such as API keys. Whether stored by the client to be authenticated or the server to which the client authenticates, the credentials are susceptible to various attacks.

To resolve these issues with secret management and others, behavioral data associated with an application or device is used to lock a secret key value during a setup phase and unlock the key for authentication. The key is a credential for authenticating the application or device to an authentication server computer, such as a cryptographic key, API key, token, or password. In a setup or enrollment phase, the key is used to generate a polynomial, along with behavioral data that identifies the application or the device. This behavioral data can be gathered by sensors within the device or in a network coupled to the device, such as firewalls, intrusion detection systems, and operating-system monitors. Points on the polynomial are stored in a data vault, along with random chaff points which obscure the points on the polynomial. This data vault is referred to as a fuzzy vault, and the enrollment and reconstruction of the key for authentication may be performed by a fuzzy extractor server computer.

During authentication, the fuzzy extractor server computer retrieves behavioral data from the sensors. The fuzzy extractor server computer unlocks the fuzzy vault by reconstructing the polynomial based on the behavioral data. If the gathered behavioral data matches the behavioral data that was used in the setup phase with some noise tolerance (e.g., indicating the authentication request originated from the same application or device), then the fuzzy extractor server can reconstruct the key based on the polynomial. The fuzzy extractor server releases the secret key value to an authentication server computer. The authentication server computer can compare the reconstructed key value to a stored key value and authenticate the application or the user device if the keys match. In some embodiments, the authentication server computer stores the key value in hashed form, and the fuzzy extractor server hashes the value key before transmitting it to the authentication server for validation. This further protects the secret key from compromise.

Embodiments include an application or device authentication technique that is resistant to client compromise. The fuzzy extractor server computer may continuously or periodically collect the behavior of an application or user device for authentication. Application and user device behavior is unique and non-replicable, albeit noisy. These properties allow the application or user device behavior to be uniquely mapped to an authentication credential. While this approach incorporates the behavior of the application or user device in the authentication process, it does not attempt to deploy a behavioral model at the server. Deploying a behavioral model at the server for authentication is compute-intensive, often relies on complex machine learning models, and requires a large amount of storage. Advantageously, the present techniques allow the authentication server computer to use a secure and relatively simple protocol of key validation. The present techniques make key management easier on the client, and do not require secure storage of the credentials by the client or the authentication server computer.

Enrollment System and Method Overview

FIG. 1 shows a system 100 and method for enrollment in an authentication service according to some embodiments. The system 100 can include a user device 102, sensors 104, behavioral model 105, fuzzy extractor server computer 106, and authentication server computer 108. For simplicity of illustration, a limited number of components are shown in FIG. 1. It is understood, however, that embodiments may include more than one of each component.

The components in the system depicted in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like.

In some embodiments, the user device 102 is a device operable by a user and capable of executing applications. As examples, the user device 102 may be a smartphone, a computer, a tablet, or the like. The user device 102 may authenticate to another device or application using the techniques described herein. The user device 102 itself, or an application executing on the user device 102, enrolls in an authentication service and authenticates to another device or application as described herein. An example of a user device is described in further detail below with respect to FIG. 5.

The sensors 104 include hardware and/or software configured to gather behavioral data associated with an application or device. The sensors 104 may execute on the user device 102 and/or be external to the user device 102. For example, the sensors 104 may include network monitoring devices in communication with the user device 102 over a network. Examples of sensors 104 include firewalls, intrusion detection systems, operating systems, and client applications. Sensors 104 provide feature values corresponding to behavior of an application or device at a given time.

The behavioral model 105 maps the behavioral data to a value such as a risk score. In some implementations, the behavioral model 105 is a machine learning classifier that distinguishes normal from compromised executions in an accurate and robust manner. In this context, robustness means resilience to adversarial attacks and to mimicry attacks in particular. The behavioral model 105 can be used to place a lower bound on the number and types of features collected from an application execution. The data collected via the sensors 104 and the value generated via the behavioral model 105 can be securely passed to fuzzy extractor server computer 106. For example, given the risk based on the type of application, the operating environment, etc., more features, or different features, may be collected. In some implementations, the behavioral model 105 uses an integrated gradient approach to derive feature attribution data (see Sundararajan et al., "Axiomatic Attribution for Deep Networks," in Proceedings of the $34^{th}$ International Conference on Machine Learning, Vol. 70, ser. ICML'17. JMLR.org, pp. 3319-3328 (2017)). Integrated gradients are used to explain the output of the sensors 104 by identifying a subset of features that contribute most to the output. The fuzzy extractor server computer 106 then focuses on values of this concise subset of features. This may be used in some aspects to gather the data from a preconfigured intrusion detection system, then customize the behavioral data that is fed to the fuzzy extractor server computer.

The fuzzy extractor server computer 106 is a server configured to manage a key securely using a fuzzy vault. The fuzzy extractor server computer 106 performs enrollment and validation processes as described herein. The fuzzy extractor server computer 106 is configured to manage and execute a pair of generation and reconstruction procedures. The fuzzy extractor server computer 106 may be separate from the authentication server computer 108, or, in some implementations, part of the authentication server computer 108. An example of a fuzzy extractor server computer 106 is described in further detail below with respect to FIG. 3.

The authentication server computer 108 can be a server computer that authenticates an application or user device 102. The authentication server computer 108 may store keys, in some implementations in hashed form, for comparison to a reconstructed key value generated by the fuzzy extractor server computer 106. In some implementations, the authentication server computer 108 may provide a resource or computing service to the application or user device 102. The authentication server computer 108 and the fuzzy extractor server computer 106, if implemented separately, are connected via secure communications channel. The communications can be secured, for example, via mutual authentication and/or message encryption.

Prior to authenticating an application or device, an enrollment process is executed. The enrollment process includes binding a key value to behavioral data associated with the application device, or a derivative thereof. The key value and the behavioral data are stored to a fuzzy vault for use in subsequent authentication processes.

In some embodiments, at S110, to start the enrollment process, the user device 102 sends an enrollment request to the authentication server computer 108. The user device 102 may, for example, transmit the enrollment request via a message, API push, or the like to the authentication server computer 108 over a network. The enrollment request includes an identifier of the application or the user device. In some implementations, the identifier of the application or user device is a secret value. The identifier of the application or user device may have been generated by the authentication server computer 108 or the fuzzy extractor server computer 106 and provided to the user device 102. For example, the authentication server computer 108 generates the identifier of the application or the user device based on one or more of the behavioral data or the secret key.

Alternatively, the identifier of the application or user device may be a random or pseudo-random value, a value assigned based on the application name, etc.

At step S112, the authentication server computer 108 identifies a key value. The key can be a credential for authenticating the user device 102 to the authentication server computer 108 such as a cryptographic key, a token, a password, an API key, etc. The authentication server computer 108 may, as examples, randomly generate the key, select a key from a set of stored keys, or generate the key using a cryptographic algorithm. In some implementations, the authentication server computer 108 stores a hash of the key value. This is advantageous in that the key value itself is not stored by the authentication server computer 108 and cannot be compromised, even if the authentication server computer 108 is compromised. Alternatively, in some implementations, the authentication server computer stores the key value in plain form. The stored key or hashed key can be used for subsequent authentication processing.

At step S114, the authentication server computer 108 transmits an enrollment request to the fuzzy extractor server computer 106. The authentication server computer 108 may first modify the enrollment request to include the key value, such that the enrollment request includes the application or device identifier and the key value. The authentication server computer may, for example, transmit a message, API push, or the like to the fuzzy extractor server computer 106 over a network.

At step S116, the fuzzy extractor server computer 106 obtains behavioral data of the application or the user device from the sensors 104 and behavioral model 105. The fuzzy extractor server computer 106 may retrieve behavioral data associated with the application or the user device from one or more sensors. In some implementations, the behavioral data is received from the sensors via the behavioral model 105. The behavioral data can include multiple features $B=\{b_1; \ldots, b_n\}$ for features 1, 2, . . . n. The features can include, for example:

Host-based features
CPU consumptions by the application or device
memory consumptions by the application or device
a number of running processes on the device
security zone information
application audit trail-based features
a number of successful communications to or from the application or device
a number of failed communications to or from the application or device
a number of files opened by the application or device
a number of files accessed by the application or device
a number of system calls by the application or device
network-based features
a number of connections by port
a sum, mean, and/or standard deviation of data length
an average response time of the application or device
a number of different source ports
a number of different destination ports
a number of connections by connection status
a number of packets sent & received by the application or device
a number of various protocols
a number of zone transfers.

As a specific example, the fuzzy extractor server computer 106 collects fourteen behavioral attributes, or features, for the application or device from various sensors 104 of an enterprise network. The features are:

a number of unique URLs accessed by an application or device,
a number of unique categories of URLs that are accessed by an application or device,
a number of bytes received by an application or device from all sources,
a number of bytes sent by an application or device to all destinations,
a number of HTTP requests initiated by an application or device,
a number of SSL requests initiated by an application or device,
a number of proxy authentication failed by an application or device,
a number of responses received with HTTP Code 200,
a number of firewall requests allowed for an application,
a number of firewall requests denied for an application,
a number of outgoing connections from the application hosting machine or device, and
a number of unique destinations based on all the outgoing connections from the application hosting machine or device.

The fuzzy extractor server computer 106 computes statistical measurements based on the individual feature values, which may correspond to many time series feature values for each feature. As a specific example, the fuzzy extractor server computer 106 collects data for each of the attributes over a two-month period. The fuzzy extractor server computer 106 calculates the mean, standard deviation, 50th percentile (median), and 75th percentile value for each attribute for a 15 day time window, resulting in 56 features.

At step S118, the fuzzy extractor server computer 206 uses the behavioral data (B in FIG. 1) to securely hide the key value. The fuzzy extractor uses a fuzzy extractor generation function ($FE_{Gen}$) to generate a fuzzy vault to hide the key value. In some embodiments, the fuzzy extractor server computer 106 hides the key value using a polynomial P. The fuzzy extractor server computer 106 distributes the key value k to d+1 shares, where d is the degree of the polynomial. The shares are set to coefficients of a polynomial of degree d, $c=\{c_1, \ldots, c_{d+1}\}$. The polynomial P is:

$$P_d(x)=c_n x^n + \ldots + c_1 x + c_0,$$

where n is the number of features selected from the application or device behavior to be included in the vault. A shared secret algorithm may be used to break the key k into d+1 shares, where each share carries only part of the secret and does not reveal the secret key on its own. All or some of the shares could be combined to reconstruct the key value.

In some embodiments, the fuzzy extractor server computer 106 encodes the behavioral data into a vector. For example, behavior $B=\{b_1; \ldots, b_n\}$ is encoded into $X=\{x_1, \ldots, x_m\}$, a vector of size m (m≤n).

In some embodiments, for each element in the encoded behavior, $x_i \in X$; $1 \leq i \leq m$, the fuzzy extractor server computer 106 computes a projection of $x_i$ on the polynomial as $$y_i = P_d(x_i).$$

The fuzzy extractor server computer 106 generates a set of genuine points in the vault, based on the encoded behavioral data and the projection of the encoded behavioral data on the polynomial. For example, the points in the fuzzy vault are:

$$F=\{(x_1;y_1), \ldots, (x_m;y_m)\}.$$

In some embodiments, the fuzzy extractor server computer 106 generates chaff points. The chaff points are included in the fuzzy vault, along with the genuine points, in order to obscure the genuine points. Thus, even if the fuzzy vault is accessed by an intruder, the genuine points cannot be discerned from the chaff points. In some implementations, a set of random chaff points is generated such that the chaff points do not lie on the polynomial.

Based on the key value, the generated genuine points and the generated chaff points, the fuzzy extractor server computer 106 initializes the fuzzy vault. The fuzzy extractor server computer 106 initializes the fuzzy vault by generating these points and storing them together. The fuzzy vault generation process is described further below with respect to FIGS. 6 and 8.

In some embodiments, at S120, the fuzzy extractor server computer 106 transmits the fuzzy vault V to the user device 102. In some implementations, the fuzzy vault V is stored to the user device. Alternatively, or additionally, the fuzzy vault V can be transmitted to, and stored by, the authentication server computer 108. Alternatively, or additionally, the fuzzy vault V is stored by the fuzzy extractor server computer 106. Since the key value is obscured within the fuzzy vault V, it need not necessarily be stored to secure hardware.

At step S122, the fuzzy extractor server computer 106 discards the key value. In some implementations, neither the fuzzy extractor server computer 106 nor the authentication server computer 108 stores the plaintext key, preserving the security of the key.

At step S124, the fuzzy extractor server computer 106 transmits a notification to the authentication server computer 108 that enrollment is complete. Once enrollment is complete, the fuzzy vault can be used to authenticate the application or the user device.

Authentication System and Method Overview

Figure 2:
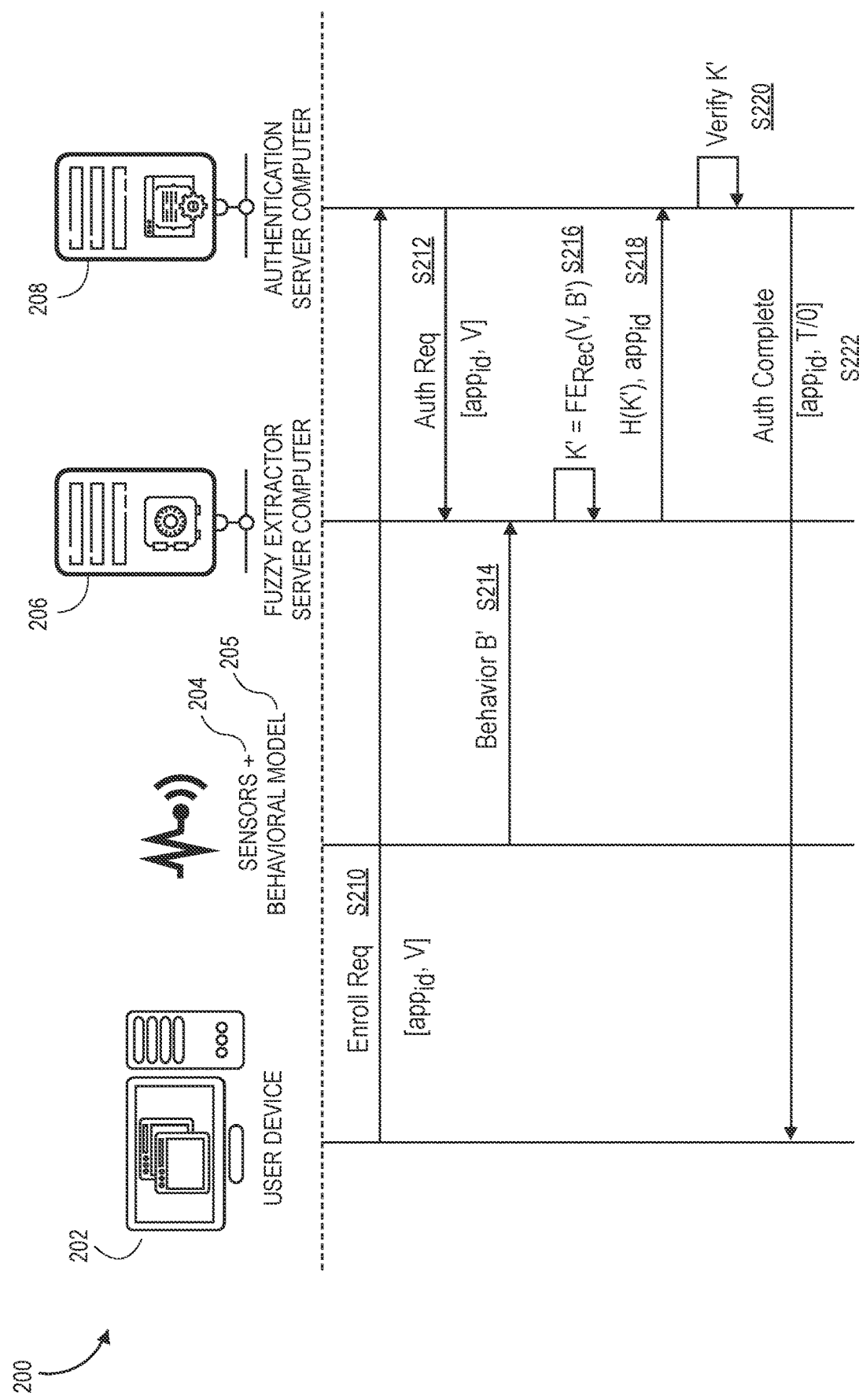
FIG. 2 illustrates an overview of a system and method for authentication according to some embodiments.

FIG. 2 shows a system 200 and method for authentication according to some embodiments. The system 200 can include a user device 202 (e.g., the user device 102 shown in FIG. 1), sensors 204 and behavioral model 205 (e.g., the sensors 104 and behavioral model 105 shown in FIG. 1), fuzzy extractor server computer 206 (e.g., the fuzzy extractor server computer 106 shown in FIG. 1), and authentication server computer 208 (e.g., the authentication server computer 108 shown in FIG. 1).

At step S210, the user device 202 initiates authentication to the authentication server computer 208. The user device 202 transmits, to the authentication server computer 208, an authentication request. The authentication request includes the identifier of the application or device. In some implementations (e.g., if the fuzzy vault V is stored to the user device 202), the authentication request also includes the fuzzy vault V. The user device 202 may, for example, transmit the authentication request via a message, API push, or the like to the authentication server computer 208 over a network.

At step S212, the authentication server computer 208 forwards the authentication request to the fuzzy extractor server computer 206. The authentication server computer 208 may, for example, transmit the enrollment request via a message, API push, or the like to the fuzzy extractor server computer 206 over a network.

At step S214, the fuzzy extractor server computer 206 retrieves behavioral data B' from the sensors 204 and/or the behavioral model 205. The behavioral data may include a set of values, corresponding to a set of behavioral features, as described above with respect to step S116 of FIG. 1. At this later time, the behavioral features $B'_i$ are most likely different from the initial behavioral features $B_i$ gathered in the enrollment phase described above with respect to in FIG. 1. For example, the application or device has generally performed additional operations in the meantime, such as sending additional messages, performing additional CPU cycles, and so forth. Nevertheless B and B' will have some degree of similarity if gathered in connection with the same application or device.

At step S216, the fuzzy extractor server computer 206 executes a key reconstruction process to reconstruct the key value from the current behavior of the application or device and the fuzzy vault V. The fuzzy extractor server computer may reconstruct the key value by interpolating a polynomial based on the behavioral data retrieved at step S214. For example, the fuzzy extractor server computer encodes the behavioral data $b'_0$ to x values, $X'=\{x'_1, \ldots, x'_m\}$. The fuzzy extractor server computer 206 identifies values in the fuzzy vault V whose coordinates are close, within some threshold, to the encoded behavioral data. The fuzzy extractor server computer 206 may, for example, compute a distance according to a distance function and identify a distance from the encoded behavioral data retrieved at S214 and the points in the fuzzy vault V. For each element in the encoded behavior vector, the closest pair $(x_i; y_i)$ is selected based on a distance function. The distance between two values x and $x_0$ can be measured by a distance function $D(x,x')=|x-x'|$.

A candidate set F' is generated for all the pairs selected from the vault representing possible points on the polynomial. A set of points may be selected if the distance is less than some threshold value. By identifying these points, the fuzzy extractor server computer 206 reconstructs the polynomial P. Techniques for reconstructing the polynomial are described in further detail below with respect to FIG. 7.

Using the reconstructed polynomial P, the fuzzy extractor server computer 206 reconstructs a reconstructed key value k'. For example, k' is identified from the coefficients of the reconstructed polynomial P. The reconstruction process is described in further detail below with respect to FIGS. 7 and 9.

In some implementations, to account for changes in the application or user device behavior over time, multiple attempts can be made, and the stored template data may be updated if needed. For example, if the hash of the enrollment key does not match the hash of the reconstructed key value, steps S214-S218 may be repeated until a maximum number of attempts is reached. In some cases, the fuzzy extractor server computer may confirm that a non-matching application or device is indeed the same application or device (e.g., using machine learning or administrator confirmation). The fuzzy vault can be updated based on the new behavioral data.

At step S218, the fuzzy extractor server computer 206 computes a hash of k' H(k') and transmits the hash of the reconstructed key value (H(k')) to the authentication server computer 208. Alternatively, the fuzzy extractor server computer 206 may send the reconstructed key value to the authentication server computer 208 in plaintext form. The fuzzy extractor server computer 206 may further transmit the identifier of the application or device to the authentication server computer 208 to facilitate matching the key value to the application or user device.

At step S220, the authentication server computer 208 verifies the received hashed key (H(k')) using the stored hash of the enrollment key (H(k)). The authentication server computer 208 may compare the hashed reconstructed key value and the hashed enrollment key and determine whether the hashed keys match.

At step S222, the authentication server computer 208 transmits a notification of completed authentication to the user device 202. The notification may include the identifier of the application or the user device, and an indication of whether authentication was successful. Whether authentication is successful is a function of the reconstructed key value k', and may further be based on a threshold (T/O, as shown in FIG. 2), as noted above with respect to step 220. If the hash of the reconstructed key value (k') and the stored enrollment key (k) match, then the authentication server computer 208 may send an authentication success message to the user device 202 and/or grant the user device 202 access to a service or resource. If the hash of the reconstructed key value (k') and the stored enrollment key (k) do not match, then the authentication server computer 208 may send an authentication failure message to the user device 202 and/or refuse the user device 202 access to a service or resource.

Example Fuzzy Extractor Server Computer

Figure 3:
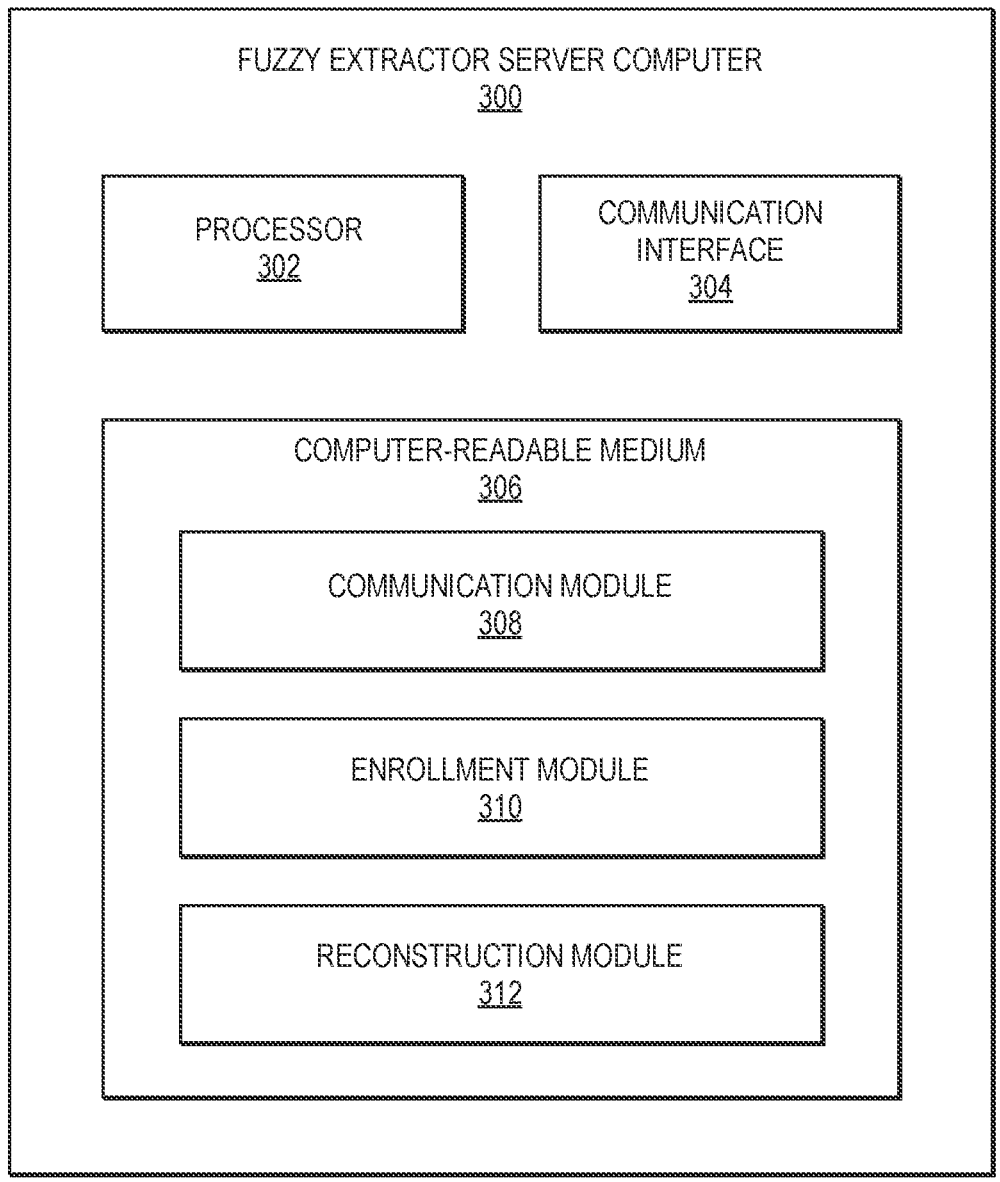
FIG. 3 shows a fuzzy extractor server computer according to some embodiments.

FIG. 3 shows a block diagram of a fuzzy extractor server computer 300 according to some embodiments. The fuzzy extractor server computer 300 may include a processor 302. The processor 302 may be any suitable processing apparatus or device as described above. The processor 302 may be coupled to a communication interface 304 and a computer-readable medium 306.

The communication interface 304 may include an interface that can allow the fuzzy extractor server computer 300 to communicate with external computers. The communication interface 304 may enable the fuzzy extractor server computer 300 to communicate data to and from another device (e.g., the user device, the authentication server computer, etc.). Some examples of a communication interface 304 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the communication interface 304 may include Wi-Fi™. Data transferred via the communication interface 304 may be in the form of signals which may be electrical, electromagnetic, optical, or any other signal capable of being received by the external communications interface (collectively referred to as "electronic signals" or "electronic messages"). These electronic messages that may comprise data or instructions may be provided between the communication interface 304 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium. The communication interface 304 can utilize a long-range communication channel and/or a short-range communication channel.

The computer-readable medium 306 may be a non-transitory computer-readable medium that includes software code stored as a series of instructions or commands. The computer-readable medium 306 may comprise code, executable by the processor 302, to implement a method comprising: receiving, by a server computer, an authentication request comprising an application identifier associated with an application or a user device identifier associated with a user device, the authentication request originating from the user device; receiving, by the server computer, a set of behavioral data associated with the application or the user device; responsive to receiving the application identifier or device identifier, obtaining, by the server computer, a fuzzy vault associated with the application identifier or the user device identifier; and determining, by the server computer, a reconstructed key value using the fuzzy vault and the set of behavioral data, wherein the application or the user device is authenticated using the reconstructed key value.

The computer-readable medium 306 may include a communication module 308, an enrollment module 310, and a reconstruction module 312. Each of these modules may include code configured to perform the functions described below in conjunction with the processor 302.

The communication module 308 may comprise code that causes the processor 302 to generate messages, forward messages, reformat messages, and/or otherwise communicate with other entities.

The enrollment module 310 may comprise code that causes the processor 302 to perform an enrollment process. As described above with respect to FIG. 1, the enrollment process can include generating a fuzzy vault that stores points including genuine points that lie on a polynomial generated based on behavioral data of an application or device that is enrolling in an authentication service, in order to hide a key value used for authenticating the application or device. The enrollment module may comprise code enabling the fuzzy extractor server computer 300 to perform any functions associated with generating data vaults. These functions may include generating functions based on key values, generating genuine points by applying a behavioral data as input to the function, generating random or chaff points, and packaging or grouping the genuine points and chaff points into a data vault, as described herein. The enrollment module 310 may make use of any appropriate mathematical libraries to perform these functions, such as libraries associated with random or pseudorandom number generation, generating of functions, and functional analysis.

The reconstruction module 312 may include code that causes the processor 302 to reconstruct a key value for performing authentication of the application or the user device. The reconstruction module 312 may comprise code or instructions executable by the processor 302 for storing and unlocking data vaults, as described above with reference to FIG. 2. These code or instructions may include, for example, using gathered behavioral data to determine a subset of genuine points corresponding to a fuzzy vault, interpolating a function, and determining a reconstructed key value based on the function. The reconstruction module 312 may, in cooperation with the processor 302, gather behavioral data associated with an application or device to be authenticated. The reconstruction module 312 reconstructs a polynomial based on the behavioral data, which is used to reconstruct the key. This reconstructed key value can then be compared to the original key used in the enrollment process in order to authenticate the application or device.

Example Authentication Server Computer

Figure 4:
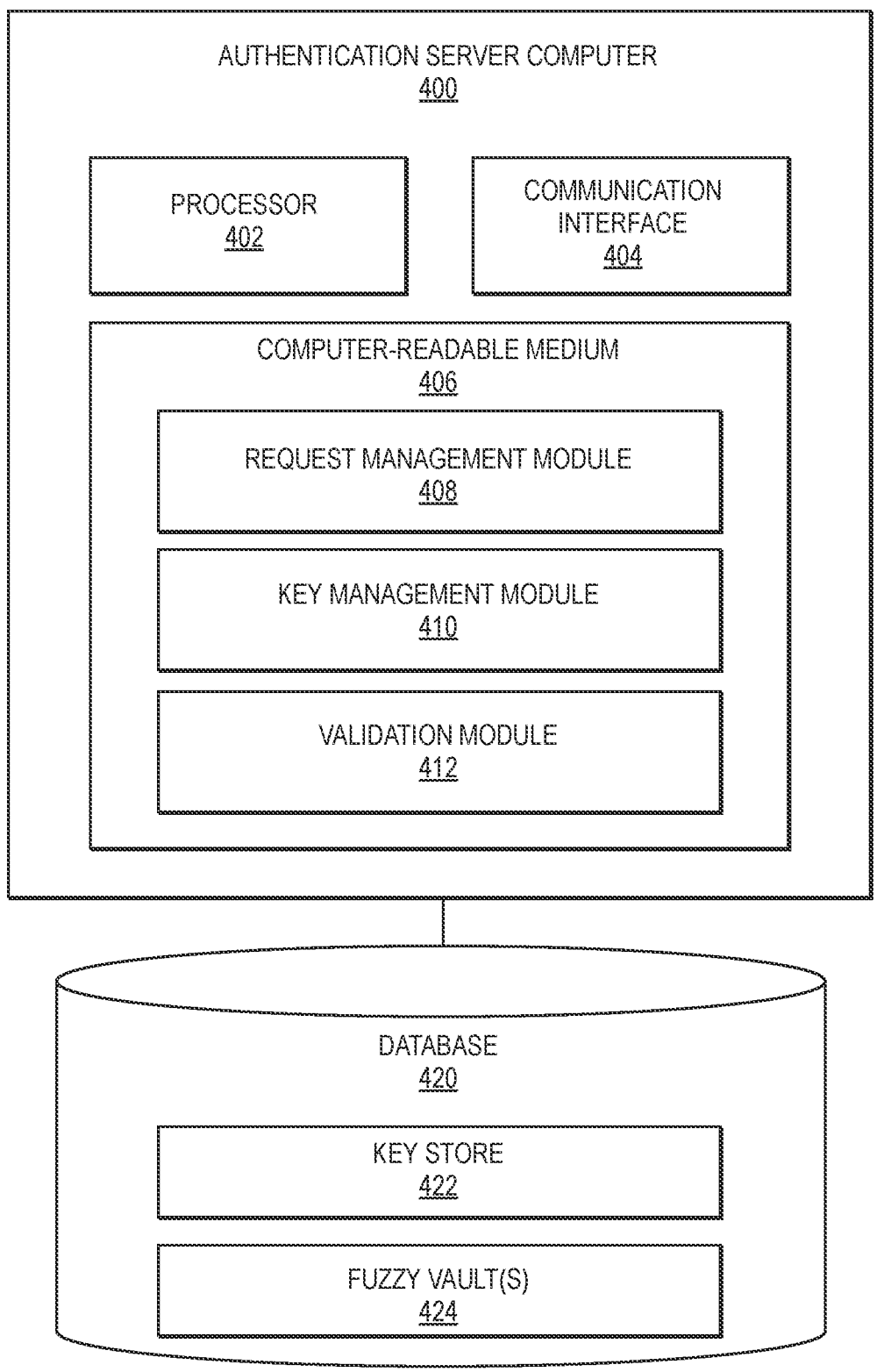
FIG. 4 shows an authentication server computer according to some embodiments.

FIG. 4 shows a block diagram of an authentication server computer 400 according to some embodiments. The authentication server computer 400 may include a processor 402 coupled to a communication interface 404 and a computer-readable medium 406. The processor 402 and communication interface 404 may be similar to the processor 302 and communication interface 304 described above with respect to FIG. 3. The authentication server computer 400 may further include, or be communicatively coupled to, a database 420.

The computer-readable medium 406 may be a non-transitory computer-readable medium that includes software code stored as a series of instructions or commands. The computer-readable medium 406 may comprise code, executable by the processor 402, to implement a method comprising: transmitting, by an authentication server computer, an authentication request for an application or a user device comprising an application identifier or a user device identifier, the authentication request originating from the user device, thereby causing computation of a reconstructed key value using a fuzzy vault associated with the application identifier or the user device identifier and a set of behavioral data associated with the application or the user device; and authenticating, by the authentication server computer, the application or the user device using the reconstructed key value.

The computer-readable medium 406 may include a request management module 408, a key management module 410, and a validation module 412. Each of these modules may include code configured to perform the functions described below in conjunction with the processor 402.

The request management module 408 may include code that causes the processor 402 to manage enrollment and authentication requests. Managing the requests may include generating messages, forwarding messages, reformatting messages, and/or otherwise communicating with other entities.

The key management module 410 may comprise code that causes the processor 402 to manage keys. This may include generating hashed keys. Key management performed by the key management module 410 may further include storing the keys, in some implementations in hashed form, to the database 420.

The database 420 may be a be a storage unit and/or device (e.g., a file system, database, collection of tables, or other storage mechanism) for storing data. In some embodiments, the database 420 includes a key store 422 and one or more fuzzy vaults 242. The key store 422 includes keys, potentially in hashed form, which may be indexed to different application or device identifiers for different applications and devices enrolled in the authentication protocol. As noted above with respect to FIG. 1, the keys may be cryptographic keys, tokens, passwords, or any suitable credential.

In some implementations, the fuzzy vault is stored in the authentication server computer. The database 420 may include a set of fuzzy vaults 424, each indexed to a respective application or device identifier. For example, application A has a first fuzzy vault stored to the database 420 in association with an identifier of application A, application B has a second fuzzy vault stored to the database 420 in association with application B, and so forth. Alternatively, or additionally, a user device may store a fuzzy vault locally as illustrated in FIG. 5.

The validation module 412 may include code that causes the processor 402 to validate authentication using a key, potentially in hashed form, from the key store 422 of the database 420 and a reconstructed key value received from the fuzzy vault server. The validation module 412 compares the reconstructed key value to a corresponding key in the key store 422. The validation module 412 may cause the processor 402 to determine whether the reconstructed and stored keys match.

Example User Device

Figure 5:
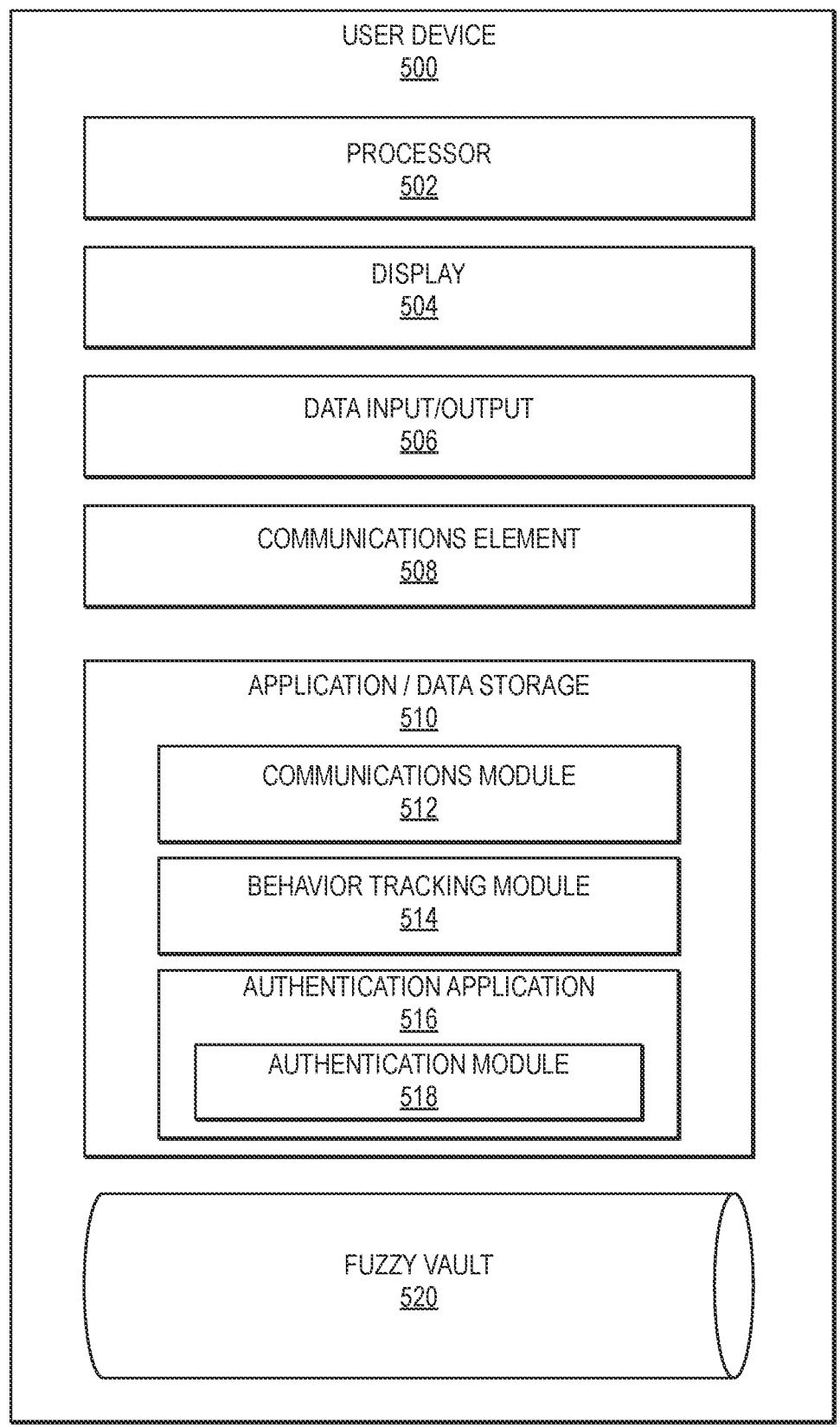
FIG. 5 shows a user device according to some embodiments.

FIG. 5 shows an example of a user device 500 according to some embodiments. The user device 500 may include circuitry that is used to enable certain device functions, such as wireless communication or telephony. The functional elements responsible for enabling those functions may include a processor 502 that can execute instructions that implement the functions and operations of the user device. Processor 502 may access application/data storage 510 (or another suitable memory region or element) to retrieve instructions or data used in executing the instructions.

Data input/output 506, such as a keyboard or touchscreen, may be used to enable a user to operate the user device 500 (for example, allowing the user to navigate to an authenticating application 516). Data input/output 506 may also be configured to output data (via a speaker, for example). Display 504 may also be used to output data to a user. Communications element 508 may be used to enable data transfer between the user device 500 and a wired or wireless network (via antenna 524, for example), enable data transfer functions, and may be used to assist in connectivity to the Internet or another network.

The application/data storage 510 may comprise a computer-readable medium that may include a number of software modules, such as communications module 512, behavior tracking module 514, authenticating application 516, and authentication module 518. The fuzzy vault 520 stores data corresponding to a set of points that securely store a key for authentication, as described above. The fuzzy vault 520 may be stored within the application/data storage 510 or in a separate storage unit or device.

The communications module 512 may comprise code enabling the processor 502 to implement or enable communications between the user device 500 and other devices, such as other user devices or server computers. The communications module 512 may allow communication according to any appropriate protocol, such as TCP, UDP, IS-IS, OSPF, IGRP, EIGRP, RIP, BGP, etc. The communications module 512 may allow secure communication by enabling the processor 502 to establish a secure or encrypted communication channel between the user device 500 and other devices. The communications module 512 may allow the transmission of fuzzy vaults and other data to other devices, such as the authentication server computer or fuzzy vault server computer.

The behavior tracking module 514 may comprise code enabling the user device 500 to track behavior of the authenticating application 516 or the user device 500. The behavior tracking module 514 may include sensors, as described above with respect to FIG. 1, for tracking application or device behaviors such as memory consumption, CPU consumption, number of files accessed, etc.

The authenticating application 516 may be an application that authenticates to an authentication server computer using the techniques described herein. The authenticating application 516 may be any suitable type of application such as an email application, banking application, social media application, shopping application, antivirus application, automation engine, malware sandboxing application, endpoint response tool, etc. In some aspects, the authenticating application 516 interacts with the authentication server computer to request access to a secure resource or computing service. For example, the authenticating application 516 executes in an enterprise system with the authentication server computer. Responsive to a request to access a secure resource or computing service, authentication operations may be performed.

The authentication module 518 performs authentication functions, and may be part of the authenticating application 516, or separate (e.g., in the case of authenticating the user device as a whole). Functions of the authentication module 518 may include preparing an authentication request and tracking necessary information to send with the authentication request, such as the fuzzy vault 520 and an identifier of the application or user device.

Techniques for Securing a Key Using a Fuzzy Vault

Figure 6:
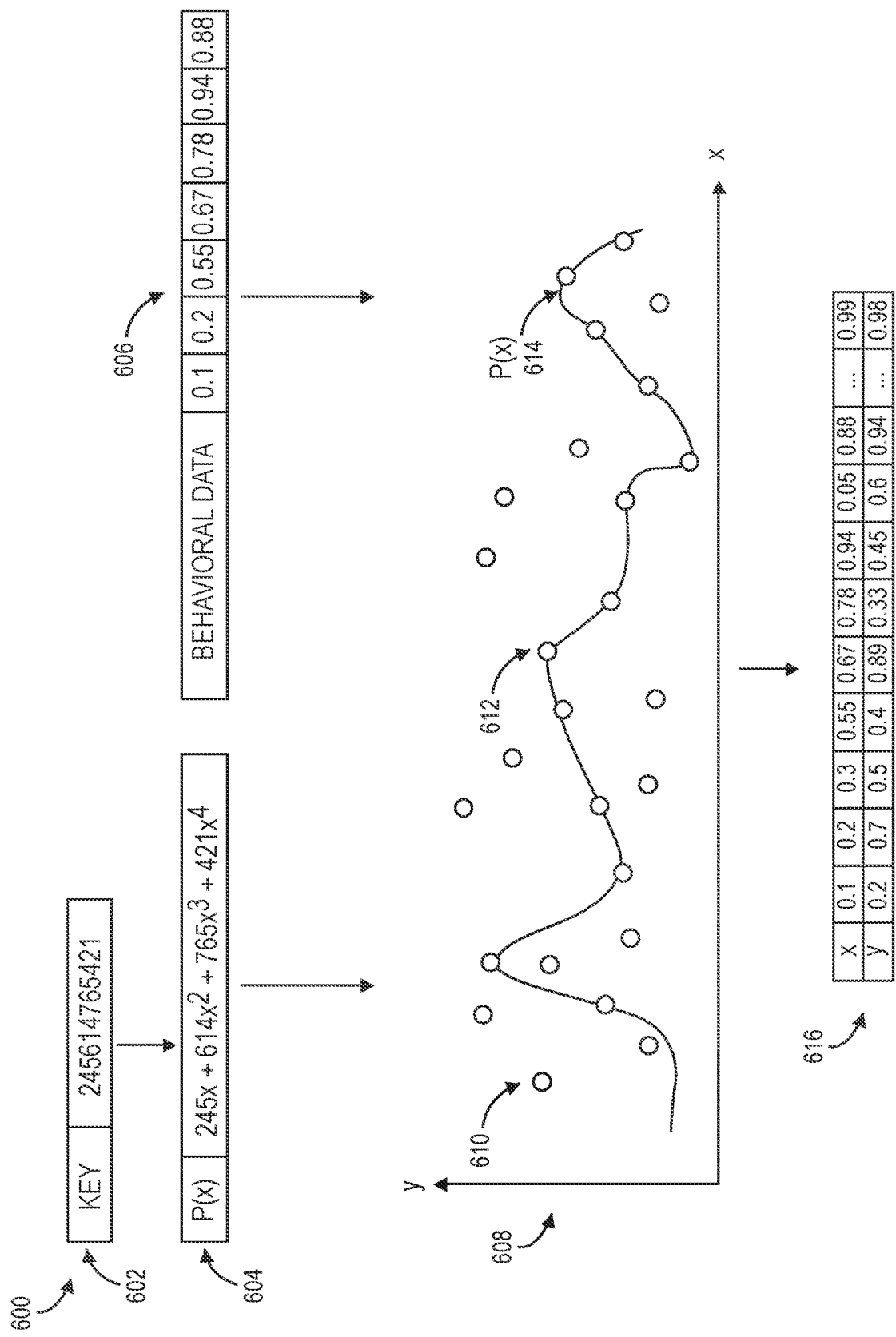
FIG. 6 is a schematic diagram illustrating fuzzy vault generation techniques according to some embodiments.

FIG. 6 shows a schematic diagram illustrating techniques for securely storing a key by generating a fuzzy vault 608.

Generally, a data vault (e.g., the fuzzy vault 608) includes a set of points. Each point can comprise two values, labeled in FIG. 6 as "x" and "y." Some points are "random points" or "chaff points." These points may correspond to two random values. Other points correspond to data and a function of that data. In embodiments, these other points may be referred to as "genuine points" and may correspond to a key value 602, behavioral data 606 (e.g., a feature vector based on behavioral data associated with the application or the user device) and a function P(x) 604. The function P(x) 604 may be derived from the key value 602. Thus, the fuzzy vault 608 may include a set of points including a set of random points and a plurality of genuine points corresponding to behavioral data associated with an application or device and a key value 602.

Because the fuzzy vault 608 contains random points, it is not possible to distinguish, by observation alone, which points correspond to the key value 602 or the behavioral data 606. As a result, the key value 602 and the behavioral data 606 cannot be extracted from the fuzzy vault 608 by malicious actors. Likewise, because the fuzzy vault 608 contains random points, it is not possible to uniquely determine the function P(x) 604 by observation alone.

Techniques for generating a fuzzy vault 608 may be performed in some implementations by a fuzzy vault server computer as depicted in FIG. 3. The fuzzy vault server computer may generate a function P(x) 604 corresponding to the key value 602. In the example depicted in FIG. 6, the key value 602 is shown as a 12 digit numeric sequence. The function P(x) 604 can be generated using a number of different techniques. One technique involves generating a polynomial function of x using digits corresponding to key value 602.

In some embodiments, the fuzzy extractor server computer applies secret sharing techniques to embed the key value into a polynomial. The fuzzy extractor server computer may apply a secret sharing algorithm that breaks the key value into a set of shares, where each share carries only part of the secret key and does not reveal the secret key on its own.

As illustrated in FIG. 6, the function P(x) 604 can be generated, for example, by using each block of three consecutive digits of the key value 602 as polynomial coefficients. Polynomial functions may be convenient because there are efficient techniques of generating and interpolating polynomials, which may be used to lock and unlock the vault respectively. However, embodiments can be practiced with functions P(x) 604 other than polynomial functions.

The fuzzy extractor server computer can then generate a set of genuine points by applying a feature vector representing behavioral data 606 of the application or device as an input to the function P(x) 604. Each value in the feature vector may be a normalized, averaged, and/or otherwise altered behavioral data 606 point gathered by sensors in or coupled to the application or device to be authenticated. Techniques for generating a feature vector representing the behavioral data are described in further detail below with respect to FIG. 9.

The feature vector of behavioral data 606 may include a sequence or array of data values corresponding to behavioral features of an application or device. Each data value may be represented numerically. To project the feature vector into a polynomial, each data value and may be applied as input to the function P(x) 604. The result is a set of P(x) or "y" values. These values may be paired with their respective behavioral data 606 ("x") values in order to generate the set of genuine points. The fuzzy extractor server computer can likewise generate a plurality of random chaff points 610, e.g., using a random or pseudo-random number generator.

The fuzzy vault 608 is depicted in graphical form. Random chaff point 610 is an example of a random point, corresponding to neither function P(x) 604, key value 602, or behavioral data 606. Genuine point 612 is an example of a genuine point, lying on line 614 corresponding to function P(x) 604, which is a function of the key value 602 and the behavioral data 606.

The fuzzy vault is also depicted as a set of values 616. The set of values 616 in the fuzzy vault includes x, y values corresponding to both the genuine points 612 and the random chaff points 610. The set of values 616 may be unordered or shuffled, such that it is not possible to determine which of the set of values 616 correspond to random chaff points 610 and which of the set of values correspond to genuine points 612 based on the order of the set of values 616 in the fuzzy vault.

Techniques for Reconstructing a Key Using a Fuzzy Vault

Figure 7:
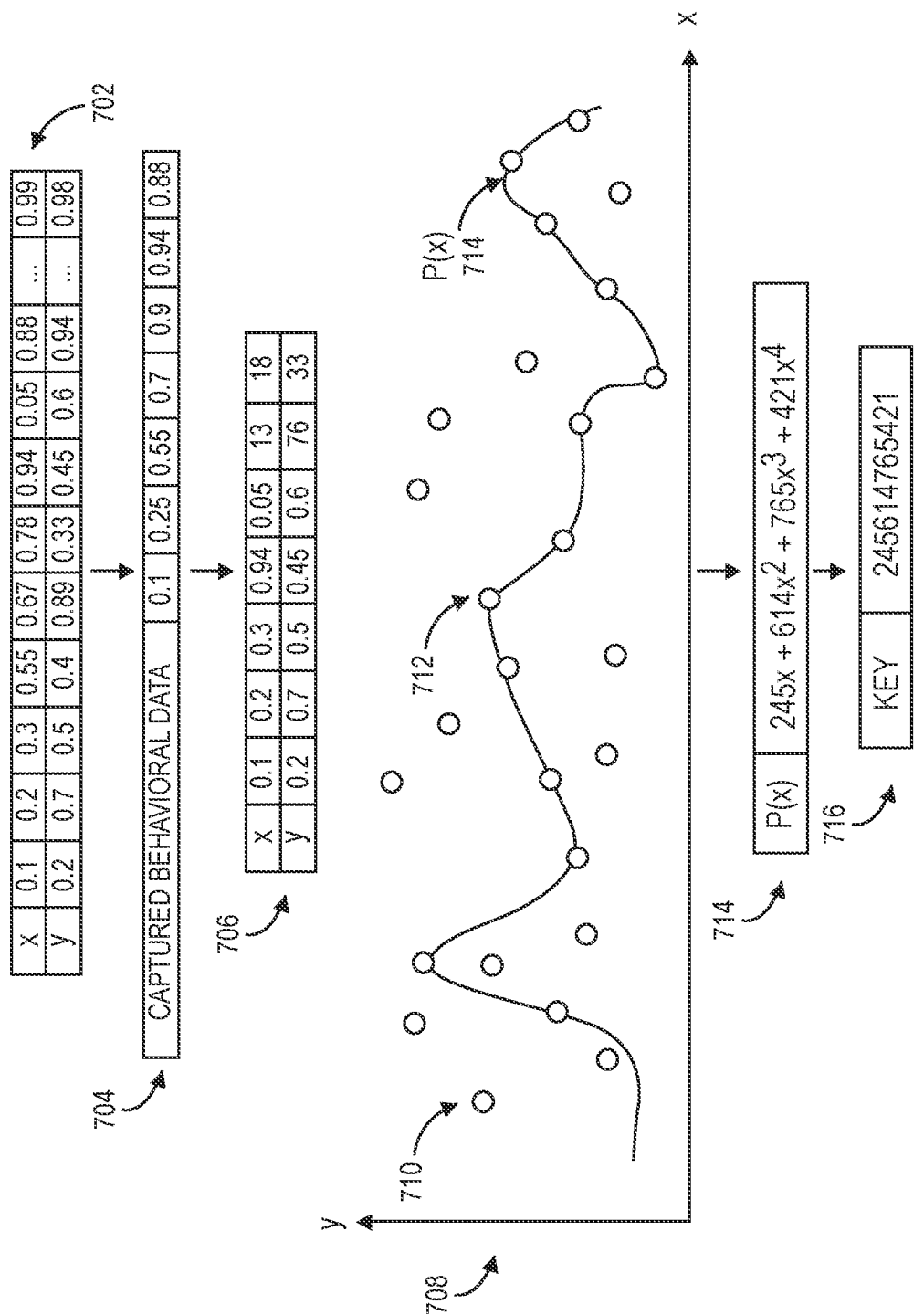
FIG. 7 is a schematic diagram illustrating fuzzy vault unlocking techniques according to some embodiments.

FIG. 7 shows a schematic diagram illustrating techniques for reconstructing a key by unlocking a fuzzy vault according to some embodiments. These techniques can be used to reconstruct a reconstructed key value 716 for authenticating an application or a device, and can be performed by a fuzzy extractor server computer as depicted in FIG. 3. The fuzzy vault is a data set which is depicted in FIG. 7 as both a set of values 702 and a graphical depiction of a fuzzy vault 708 as plotted points represented by the set of values 702.

Figure 9:
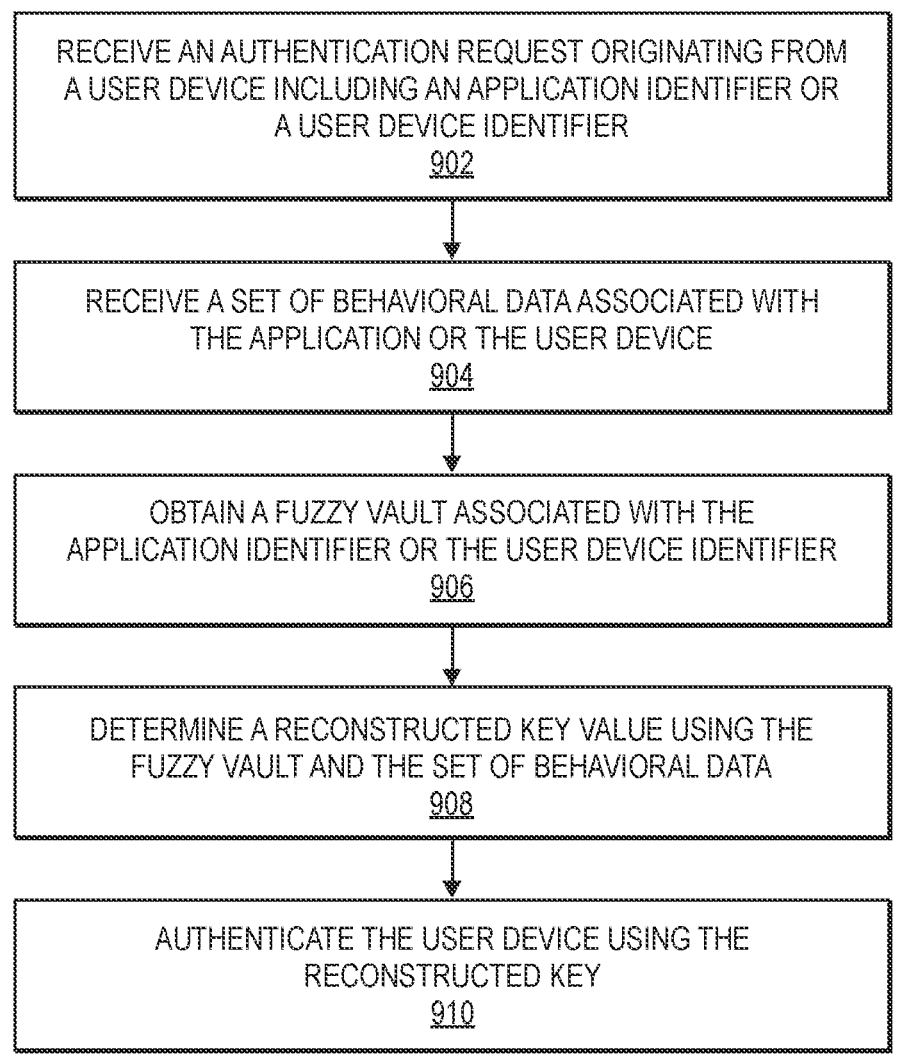
FIG. 9 is a flow chart illustrating authentication techniques according to some embodiments.

In some embodiments, the fuzzy extractor server computer compares the set of values 702 in the fuzzy vault to the captured behavioral data 704 (i.e., the set of behavioral data received step S214 of FIG. 2 and at step 904 of FIG. 9, which may be normalized, averaged, or otherwise manipulated as described with respect to step 904 of FIG. 9). The fuzzy extractor server computer compares the set of values 702 in the fuzzy vault to the captured behavioral data 704 to determine a subset of the set of values 706 in the fuzzy vault corresponding to the captured behavioral data 704.

The subset of the set of values 706 in the fuzzy vault include points that have common values between the captured behavioral data 704 and the set of values 702 in the fuzzy vault. As the behavior of the application or device changes over time, the captured behavioral data 704 will likely diverge from an exact match with the genuine points in the fuzzy vault, even though they originate from the same application or device. For example, behavioral features may vary day-to-day as the application or device performs different functions on different days. One day the user may use an application or device heavily, and other days not use it at all. As a result, behavioral features such as CPU cycles, memory usage, and network transmissions will vary over time.

Thus, it is expected that the behavioral data will not match exactly, and there is not necessarily a value in the captured behavioral data 704 corresponding to each value 702 in the data vault. However, it is expected that at least some (i.e., a subset) of behavioral data values stored to the fuzzy vault (e.g., points 712 on the polynomial) will match the captured behavioral data 704 points. These subset of the set of values 706 in the fuzzy vault may include points from the fuzzy vault 708 that share a value, (e.g., the "x" value), or are close enough within a certain threshold, to the captured behavioral data 704.

In some implementations, the points in the fuzzy vault are selected using a distance function. The distance between two feature values x (e.g., a value in the fuzzy vault) and x' (e.g., a detected behavioral feature) can be measured by a distance function D(x, x')=|x−x'|. As an example, Euclidean distance can be used to measure the distance between two points. The closeness of a feature value collected during authentication to the one stored in the vault is computed using the distance function. If the distance is less than a predefined threshold, then the nearest x value and corresponding y value stored to the fuzzy vault are selected.

Behavioral data associated with an application or device is inherently noisy and changes over time. Unlike biometric data such as fingerprints, which can be expected to vary a small amount, and credentials such as passwords, which should generally not vary at all, application or device behavioral data may significantly change over time. Thus, variations due to noise and variations in application behavior should be accounted for by selecting the right threshold to facilitate authentication within the appropriate range of behavioral data values to account for the noise. The appropriate threshold will allow the application or device to accurately authenticate in different circumstances despite the noise, while rejecting malicious and erroneous attempts. If the distance is less than a predefined threshold, then the vault value is selected to reconstruct the key value. Overall, a larger threshold allows higher noise therefore reduces the false rejection rate, but may increase the chance of authenticating wrong applications, i.e., increases the false acceptance rate. Various approaches may be implemented for selecting a threshold. For example, the fuzzy extractor server computer may use one global threshold, one threshold per application instance, or one threshold per feature of each application instance.

For the one global threshold approach, the fuzzy extractor server computer uses one single threshold for all features and all applications. For this approach, an initial a numeric value is selected, and an optimal value is identified by gradually changing the threshold experimentally. For example, authentication is performed to identify a rate of false positives and/or a rate of false negatives, and the threshold is adjusted to reduce false positives and/or false negatives. The appropriate threshold may vary according to the degree of the polynomial used and the features of interest. In some implementations, for a 32 degree polynomial, a threshold of around 50 (e.g., 57.5) is selected.

For the one threshold per application instance approach, the fuzzy extractor server computer selects a single threshold for all features of one single application. The fuzzy extractor collects and normalizes behavioral data associated with the application or user device over a time period (e.g., 2 months). The normalization may be performed using a MinMax Scaler algorithm, as further described below with respect to FIG. 9. The fuzzy extractor server computer maps the normalized values to a binary feature vector, as further described below with respect to FIG. 9 As described below with respect to step 904 of FIG. 9, mapping the normalized values to binary features may include computing quantized vectors $b_1$ and $b_2$. For each feature, the fuzzy extractor server identifies the minimum and maximum values of $b_1$ and $b_2$ and calculates the difference between the maximum and minimum values. The fuzzy extractor server selects the maximum difference from all the features of the application or device. The maximum difference is set to the threshold for the application. Different functions of the difference between the maximum and minimum values of $b_1$ and $b_2$ may be implemented, such as $$\frac{max - min}{2} \text{ or } \frac{max - min}{4}.$$

The optimal configuration can then be experimentally determined.

For the one threshold per feature of each application instance approach, the fuzzy extractor server computer labels each feature. The fuzzy extractor server selects a threshold vector consisting of specific thresholds for each feature based on the ranges of values that feature will take. For example, memory usage in a given day may be expected to fall within a certain range of values. Similar to the second approach, after data normalization and binary mapping, the fuzzy extractor server computes the minimum and maximum values of $b_1$ and $b_2$ for each feature. The difference between the maximum and minimum values of $b_1$ and $b_2$ are used to establish the threshold. In some implementations, various configurations of these maximum and minimum values are used, such as $$\frac{max - min}{2} \text{ or } \frac{max - min}{3},$$

are set to the threshold of the feature. The optimal configuration can be determined experimentally.

If feature-based thresholds are applied, then the closest pairs of x and x' values are determined on a per-feature basis. The fuzzy extractor server determines the closest (x,x') pair by comparing the distance with the points that are labeled for that specific behavioral feature and comparing it to the feature-specific threshold.

Fuzzy vault 708 shows a graphical representation of behavioral data within the fuzzy vault 708. Point 712 is an example of one point belonging to the subset of the set of values 706 in the fuzzy vault that have been selected based on matching the captured behavioral data 704. A line is shown which corresponds to the function P(x) 714. The fuzzy vault also includes random chaff points 710. The subset of the set of values 706 in the fuzzy vault corresponds to points lying on the line corresponding to the function P(x) 714.

The fuzzy extractor server computer can then determine the function P(x) 714 based on the subset of the data points. There are a variety of techniques that can be used to determine the function P(x) 714. For example, if the function P(x) 714 is a polynomial function (as shown in FIG. 7), the function can be determined using polynomial interpolation, e.g., by using Lagrange polynomials.

Generally, d+1 unique points are required in order to define a polynomial of degree d. Because of this property, provided the subset of the set of values 706 includes at least n points, the function P(x) 714 can be accurately reconstructed. As an example, for a polynomial function P(x) 714 of degree four (as shown in FIG. 7), the subset of the set of values 706 should include at least five points. As another example, for a polynomial function P(x) 714 of degree sixteen, the subset of the set of values 706 should at least 17 points.

The fuzzy extractor server computer can then reconstruct the reconstructed key value 716 based on the function P(x) 714. The fuzzy extractor server computer can make use of or reverse the process used to generate the function P(x) 714 in order to determine the reconstructed key value 716. For example, if the key value 602 depicted in FIG. 6 was used by to generate polynomial coefficients in the enrollment process, then the fuzzy extractor server computer may use the polynomial coefficients in order to reconstruct the reconstructed key value 716.

Enrollment Flow

Figure 8:
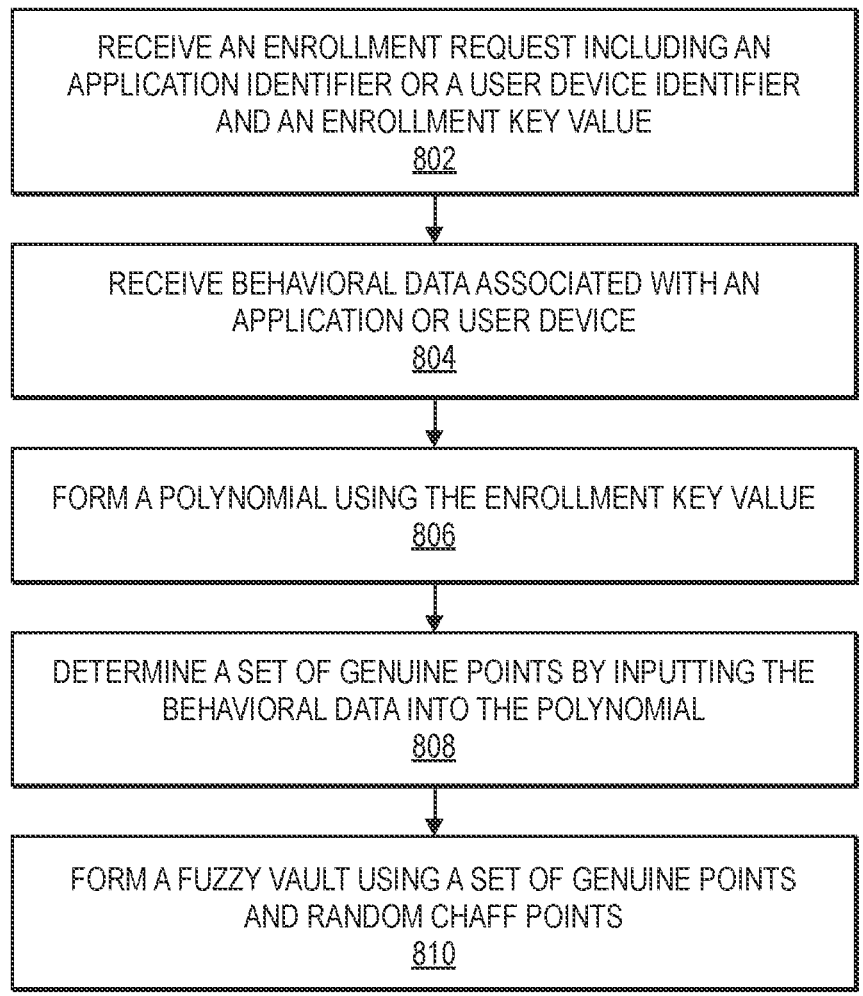
FIG. 8 is a flow chart illustrating authentication enrollment techniques according to some embodiments.

FIG. 8 is a flow chart illustrating an enrollment process 800 for authentication enrollment according to some embodiments. The enrollment process 800 may be similar to the enrollment techniques described above with respect to FIGS. 1 and 6. The enrollment process 800 may be performed by the fuzzy extractor server computer 300 depicted in FIG. 3, in cooperation with the other components of the system 100 depicted in FIG. 1.

At step 802, the fuzzy extractor server computer receives an enrollment request including an application identifier or a user device identifier and an enrollment key value. As described above with respect to FIG. 1, the application or device identifier may uniquely identify an application or device to be enrolled in an authentication service, and the enrollment key value is a secret value such as an cryptographic key, API key, token, etc. to be used in future authentication processing.

In some embodiments, the enrollment key value is generated by the authentication server computer. The authentication server computer hashes the enrollment key value to generate a hashed enrollment key value. The authentication server hashes the key by applying a hash function to map the key to a fixed-size value. The authentication server computer stores the hashed enrollment key value. The hashed enrollment key value can be used for later authentication without having to store the plaintext key, which provides enhanced security.

At step 804, the fuzzy extractor server computer receives behavioral data associated with an application or user device (e.g., a "second set of behavioral data"). As described above with respect to FIG. 1, the application or user device to be authenticated includes and/or is coupled to a set of sensors. These sensors collect behavioral data associated with the application or the user device. The behavioral data can include a set of values, each corresponding to a set of features. Each feature can include characteristic values such as memory usage, packets sent or received, bandwidth usage, etc. In some embodiments, the features correspond to time series data (e.g., each feature corresponds to a set of values and corresponding time stamps). The time series data may be averaged or otherwise manipulated to generate a feature value for use in the enrollment process 800. Various statistical values that can be computed for the behavioral data, as further described below with respect to FIG. 9. As further described below with respect to step 904 of FIG. 9, in some implementations, each behavioral feature value is also encoded and/or normalized.

At step 806, the fuzzy extractor server computer forms a polynomial using the enrollment key value. In some embodiments, one or more portions of the enrollment key value form coefficients of the polynomial. As described above with respect to FIG. 6, the fuzzy extractor server computer may split the enrollment key value into chunks (e.g., of three digits as depicted in FIG. 6, or any suitable number of digits such as 4 digits, 1 digits, etc., depending on the number of digits in the key value and the degree of the polynomial).

At step 808, the fuzzy extractor server computer determines a set of genuine points by inputting the behavioral data into the polynomial. As described above with respect to FIG. 6, the behavioral data may be encoded to a set of x values. In some implementations, the behavioral data may further be used to generate statistical values (e.g., to distill time-series data). The behavioral data may further be normalized and/or mapped to binary features. These operations are described in further detail below with respect to step 904 of FIG. 9. The result is a set of encoded feature values based on the behavioral data, which may be in the form of a feature vector including a set of feature values. The feature values are input into the polynomial to generate respective y values, as is described in further detail above with respect to FIG. 6.

In some implementations, the fuzzy extractor server computer generates an initial polynomial using an initial secret, which is subsequently updated. The fuzzy extractor server computer generates an initial secret $R_i$. The fuzzy extractor server computer may generate n random variables for n features. Use of an initial random secret can help to ensure that the fuzzy vault values generated are unique. The fuzzy extractor server computer computes an encoding based on the initial secret $X_i = B_i F(R_i)$. In some aspects, $X_i$ will be used to create a template in the next epoch, and is a function of the application data $B_i$ and the initial secret $R_i$. The fuzzy extractor server computer stores $X_i$ and $R_i$. This encoding technique can be used to "fix" arbitrary feature values. This enables normalization per application per feature and quantization in a large amount of fields, as is a challenge for the large amount of potential application data (e.g., ~$2^{16} \times 2^{16}$ fields).

Subsequent enrollment in $M^{th}$ epoch may use the function $$X_i^M = B_i^M F(X_i^{M-1})$$

$$X_i^0 = R_i.$$

Behavioral feature-chaining ensures past behavior of an application or user device is considered. Feature history compression can be used to deal with time series generated by the application or device. The system can monitor for automatic re-enrollment to handle application behavior drift.

At step 810, the fuzzy extractor server computer forms a fuzzy vault using the set of genuine points determined at step 808 and random chaff points. Forming the fuzzy vault may include storing the genuine points together with the random chaff points. The fuzzy extractor server computer may generate the random chaff points, e.g., with a random number generator. The fuzzy extractor server computer may perform a validation and/or modification to ensure that each chaff point is within a threshold boundary (e.g., according to a predetermined threshold, which can be established using the techniques described above with respect to FIG. 7). The fuzzy extractor server computer may store the genuine points mixed together with the random chaff points in an unordered fashion such that the genuine points cannot be discerned from the chaff points on simple inspection of the fuzzy vault.

As noted above with respect to FIG. 7, in some implementations, different thresholds can be established for the authentication process, including feature-based thresholds. If feature-based thresholds are used, then the chaff points may be generated on a per-feature basis. The fuzzy extractor server computer produces a set of chaff points for each feature for this threshold scheme, resulting in n+n×c total number of points in the vault, where n is the number of features and c is the number of chaff points for each feature. While adding the chaff points for a feature, the fuzzy extractor server computer may perform a validation and/or modification based on the threshold for each feature.

In some embodiments, the fuzzy extractor server computer transmits the fuzzy vault to the user device. The user device stores the fuzzy vault. Alternatively, or additionally, the fuzzy extractor server computer transmits the fuzzy vault to the authentication server computer, and the authentication server computer stores the fuzzy vault. As described above with respect to FIG. 4, in some implementations, the authentication server computer stores multiple fuzzy vaults in association with multiple identifiers of applications and/or user devices. Alternatively, or additionally, the fuzzy extractor server may store the fuzzy vault locally.

In some embodiments, after forming the fuzzy vault, the fuzzy extractor server computer deletes the enrollment key. The fuzzy extractor server need not store sensitive information, and an attack on the fuzzy extractor server will not expose sensitive information. Even if the fuzzy vault is exposed, it cannot be unlocked without the appropriate behavioral data and application or device identifier. The enrollment key is hidden in the fuzzy vault, and can be retrieved for subsequent authentication based on the behavioral data of the application of device, as described below with respect to FIG. 9.

In some embodiments, the enrollment process is periodically reexecuted to refresh the fuzzy vault. The fuzzy vault server computer may self-monitor for automatic re-enrollment to account for behavior drift in the application or user device. Application or device behavior may change over time due to different workloads, different use patterns, and so forth. In some aspects, the fuzzy vault server monitors for sequences of slow authentications (which may indicate that a match was not determined multiple times and key reconstruction was attempted multiple times). If slow authentication is detected, then the fuzzy vault server may reexecute the enrollment process described above so that the behavioral data in the fuzzy vault is up-to-date.

Authentication Flow

FIG. 9 is a flow chart illustrating an authentication process 900 according to some embodiments. The authentication process 900 may be similar to the authentication techniques described above with respect to FIGS. 2 and 7. The authentication process 900 may be performed by the fuzzy extractor server computer 300 depicted in FIG. 3 and the authentication server computer 400 depicted in FIG. 4, in cooperation with the other components of the system 100 depicted in FIG. 1.

At step 902, the fuzzy extractor server computer receives an authentication request originating from a user device. The authentication request includes an application identifier or a user device identifier. In some embodiments, the fuzzy extractor server computer receives the authentication request from the user device via the authentication server computer. The user device may, for example, transmit the authentication request via a message, API push, or the like to the authentication server computer over a network, and the authentication server computer forwards the authentication request to the fuzzy extractor server computer.

At step 904, the fuzzy extractor server computer receives a set of behavioral data associated with the application or the user device (e.g., a "first set of behavioral data"). The fuzzy extractor server computer may obtain the set of behavioral data from a plurality of sensors in communication with or within the user device. As described above with respect to FIG. 1, sensors within the user device and/or network sensors in communication with the user device may collect values associated with various behavioral features. The set of behavioral data may include CPU consumption by the application or the user device, memory consumption by the application or the user device, a number of successful communications with the application or the user device, a number of files accessed by the application or the user device, a number of system calls performed by the application or the user device, an average response time of the application or the user device, a number of packets sent by the application or the user device, a number of packets received by the application or the user device, and so forth.

In some implementations, the data collected by the sensors is further processed. The data collected may be used to compute statistical values. The data collected may be normalized. The data collected may be encoded to generate binary features.

In some embodiments, the set of behavioral data may include time series data. Due to the inherent variation of application and device behavior over time, using raw sensor data (e.g., log files and firewall statistics) may not provide an accurate representation of overall application or user device behavior. As a result, the fuzzy extractor server may capture historical trends, in addition to or instead of, instantaneous values.

In some embodiments, statistical values are computed based on the time series data for at least a subset of the behavioral data. Examples of statistical values include a total number of events (e.g., number of unique URLs accessed by an application). Another example of a statistical value is an average (e.g., an average number of responses received with HTTP Code 200 in a given time period). Another example of a statistical value is a first order statistic (e.g., a minimum value of a set of time-series data for a feature, such as the lowest memory usage of the user device in a 24 hour period). Another example of a statistical value is a second order statistic (e.g., the second lowest number of emails sent in a day by an email application). As other examples, statistical values such as a mean, median, or standard deviation may be computed for a given feature. These statistical values may be used to determine the reconstructed key value at step 908.

In some embodiments, the set of behavioral data comprises a plurality of feature values, and the fuzzy extractor server computes a normalized value for each of the feature values. Due to the variety of behavioral features that can be collected in association with application or device behavior, there is a large variety of values of the features from one feature to another. Normalization can be performed to project the values into the same range to enable comparisons. In some implementations, each feature is normalized (e.g., the average number of CPU cycles, the total number of packets sent, etc. are each normalized). The fuzzy extractor server may normalize a set of feature values using L1 normalization (See, e.g., Garcia, "L0 Norm, L1 Norm, L2 Norm, &L-Infinity Norm," Medium, available at https://montjoile.medium.com/l0-norm-l1-norm-l2-norm-l-infinity-norm-7a7d18a4f40c (2018)). Alternatively, or additionally, the fuzzy extractor server may compute a MinMax Scaler normalization to assign a normalized value for each feature based on time series data for that feature, such as a set of values for the feature over a two-month period (See, e.g., "MinMaxScaler," SciKit Learn, available at https://scikit-learn.org/stable/modules/generated/sklearn.preprocessing.MinMaxScaler.html). In some embodiments, before normalizing the feature values, the features values are used to generate a feature vector, each element of the feature vector being one of the feature values. The feature vector is then normalized, resulting in a feature vector with features with values in the range [0, 1].

In some embodiments, the fuzzy extractor server computer generates a binary feature vector for the behavioral data. For example, after computing statistical values based on the raw behavioral data and/or normalizing the behavioral data, the fuzzy extractor server computer uses selected data points to generate a binary feature vector, which can be used to determine the reconstructed key value at step 908.

The fuzzy extractor server computer may generate a binary feature vector by mapping the features (e.g., real-valued normalized features) to binary values. For example, the fuzzy extractor server computer generates two random orthonormal matrixes $Q_1$ and $Q_2$ of size m×m, where m is greater than or equal to one plus the order of the polynomial P used to construct the fuzzy vault. The orthonormal matrices may, for example, be computed using the Gram-Schmidt method (See, e.g., Taboga, "Gram-Schmidt Process," StatLect, available at https://www.statlect.com/matrix-algebra/Gram-Schmidt-process; Wang and Plataniotis, "Fuzzy Vault for Face Based Cryptographic Key Generation," Biometrics Symposium (2007)). The fuzzy extractor server computer then selects two random vectors $r_1$ and $r_2$ of size m. The fuzzy extractor server computer multiplies each column of $Q_1$ and $Q_2$, respectively, by each element of $r_1$ and $r_2$ to compute two matrices $R_1$ and $R_2$. In some implementations, $R_1$ and $R_2$ are specific to each application and stored in the fuzzy vault. Vectors $d_1$ and $d_2$ are computed as the Euclidean distance between the feature vector and each column of $R_1$ and $R_2$. Each element of $d_1$ and $d_2$ is quantized into 256, generating two binary vectors $b_1$ and $b_2$. The encoded feature vector is generated by concatenating $b_1$ and $b_2$.

At step 906, the fuzzy extractor server computer obtains a fuzzy vault associated with the application identifier or the user device identifier. The fuzzy extractor server computer may obtain the fuzzy vault by retrieving it from local storage. For example, the fuzzy extractor server queries a local data store to identify a fuzzy vault stored in association with the received identifier of the application or the user device. Alternatively, the fuzzy extractor server computer may obtain the fuzzy vault from the authentication server computer.

In some implementations, the fuzzy vault is received from the authentication server in the authentication request received at step 902. The fuzzy vault may be stored to the authentication server. In this case, for example, the authentication server computer receives an authentication request from the user device, including the identifier of the application or the user device. The authentication server computer queries a local database to identify and retrieve the appropriate fuzzy vault for that application or user device, which is stored in association with the identifier. The authentication server computer adds the fuzzy vault to the authentication request and transmits it to the fuzzy extractor server computer. The fuzzy extractor server computer receives the fuzzy vault from the from the authentication server along with the user device identifier or the user device identifier. Alternatively, or additionally, the user device may store the fuzzy vault locally, add the fuzzy vault to the authentication request, and transmit the authentication request comprising the fuzzy vault and the identifier of the application or the user device to the authentication server computer. The authentication server computer then transmits the fuzzy vault to the fuzzy extractor server computer (e.g., in the authentication request).

At step 908, the fuzzy extractor server computer determines a reconstructed key value using the fuzzy vault and the set of behavioral data. The fuzzy extractor server computer may determine the reconstructed key value by using the behavioral data to identify a candidate set of points in the fuzzy vault, forming a polynomial with the candidate set of points, and determining the reconstructed key value using coefficients of the polynomial, as described in further detail above with respect to FIG. 7. In some implementations, the binary feature vector described above with respect to step 904 is used to determine the reconstructed key value.

At step 910, the application or the user device is authenticated using the reconstructed key value. In some implementations, the user device is authenticated by the authentication server computer depicted in FIG. 4. Authenticating the user device using the reconstructed key value may include comparing the reconstructed key value to the enrollment key stored by the authentication server computer.

In some implementations, the authentication server computer stores a hash of the enrollment key. The fuzzy extractor server computer generates a hash of the reconstructed key value, and transmits the hashed reconstructed key value to the authentication server computer for authentication. The fuzzy extractor server computer may transmit the hash of the reconstructed key value and the application identifier or the user device identifier to the authentication server computer. The authentication server computer verifies the hash of the reconstructed key value with a hash of the enrollment key value. The authentication server computer may perform the verification by comparing the hashed enrollment key value to the hashed reconstructed key value. If the hashed enrollment key value matches the hashed reconstructed key value, then the user device or the application is authenticated. As described above with respect to FIG. 2, in some implementations, if the keys do not match, then the key validation process may be repeated some predetermined number of times before failure to authenticate is determined.

In some implementations, the authentication server computer notifies the user device that the user device or the application is authenticated. The authentication server computer may, for example, transmit a notification to the user device over a network, where the notification indicates authentication success or failure. Alternatively, or additionally, the application or the user device is granted access to a computing service based on the authentication. For example, the application successfully authenticates to the authentication server computer for cloud computing services. Based on authenticating the application, the authentication server computer grants the cloud computing services to the application. The application or the user device may be granted access to a secure resource based on the authentication. For example, the user device authenticates to the authentication server successfully to gain access to a file. Responsive to authenticating the user device, the authentication server computer pushes the file to the user device.

Example Fuzzy Vaults

FIG. 10 is a visualization of a fuzzy vault 1000 according to some embodiments. As described above, the fuzzy vault 1000 includes a set of points. Each point has an x value 1002 and a y value 1004. Some points are chaff points 1006. Each chaff point 1006 may correspond to two random values (e.g., an x and y value corresponding to a point in the fuzzy vault). Other points in the fuzzy vault include genuine points 1008. The genuine points 1008 are enrollment features stored to the fuzzy vault 1000. As described above, the genuine points 1008 may lie on a polynomial that is computed based on encoded behavioral values and a key value. The fuzzy vault 1000 depicted in FIG. 10 comprises the set of genuine points 1008 and the random chaff points 1006 on a graph.

Figure 11B:
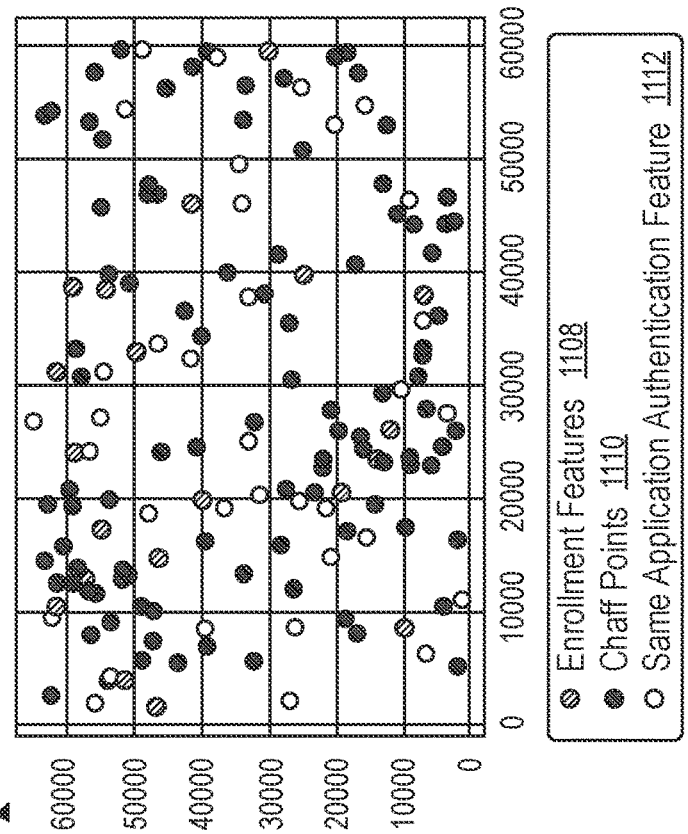
FIGS. 11A and 11B are visualizations fuzzy vaults corresponding to successful and unsuccessful authentication attempts according to some embodiments.
Figure 11A:
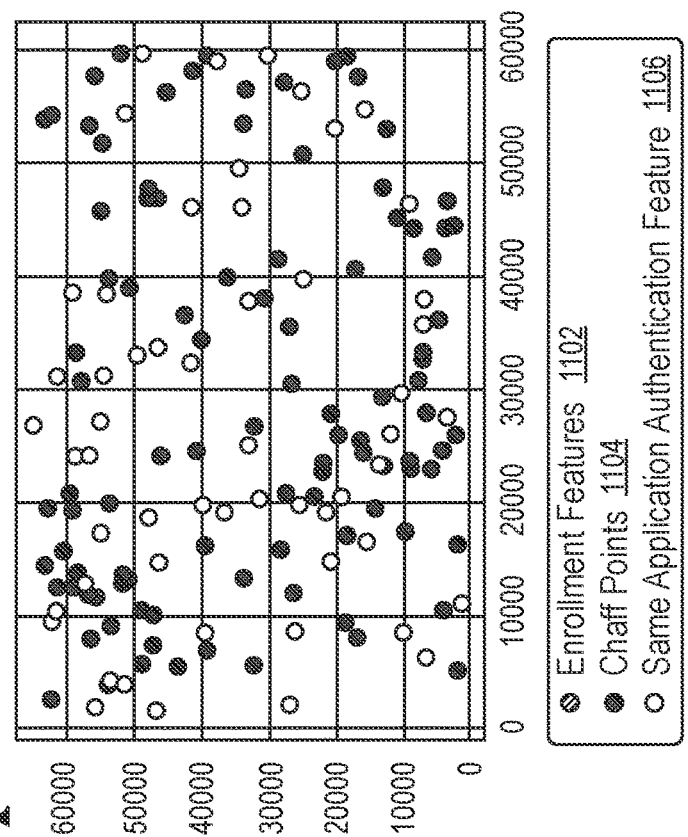

FIGS. 11A and 11B are visualizations of fuzzy vaults 1100A and 1100B corresponding to successful and unsuccessful authentication attempts, respectively according to some embodiments.

FIG. 11A shows an example of a fuzzy vault 1110A used for a successful authentication attempt. In FIG. 11A, the same application or device has been used to generate enrollment features 1102 and authentication features 1106. Chaff points 1104 are also stored for security. In the example shown in FIG. 11A, the enrollment features 1102 overlap with the authentication features 1106, and a match is determined using the techniques described herein.

FIG. 11B shows an example of a fuzzy vault 1110B used for an unsuccessful authentication attempt. In FIG. 11B, different applications or devices have been used to generate enrollment features 1108 and authentication features 1112. Chaff points 1110 are also stored for security. In the example shown in FIG. 11B, the enrollment features 1108 and the authentication features 1112 do not match, and there is little overlap between the enrollment features 1108 and the authentication features 1112 from the different application in the fuzzy vault 1110B. A match is not determined using the techniques described herein, resulting in an unsuccessful authentication attempt.

Advantages

Advantages of the techniques described herein include security against client compromise, security against vault compromise, and protection from snooping or stealing of the behavioral data. The present techniques also can be performed quickly while minimizing false acceptances and rejections.

The techniques described herein provide security against client compromise. Even if an attacker compromises an application or device enrolled in the present authentication scheme, the attacker cannot identify the key value. This is true even after observing current feature values. Thus, security against compromise of behavioral data is also provided. Even if an attacker observes behavioral feature values for a duration of time by compromising the application or device or tapping on the network, the attacker cannot duplicate the behavior of the application or device as long as the observation starts after the initial enrollment.

The techniques described herein further provide security against compromise of the data vault. If an attacker manages to access the fuzzy vault, the attacker practically cannot retrieve the key due to the uniform distribution of chaff data and behavioral data. The techniques described herein further provide security against compromise of the data vault. If an attacker manages to access the fuzzy vault, the attacker practically cannot retrieve the key due to the uniform distribution of chaff data and original behavior data.

The techniques described herein further provide dynamic authentication. The behavioral data is refreshed in the fuzzy vault to ensure accuracy of the authentication process. The protocol also allows the key to be updated (e.g., if the key is compromised, the key can be revoked and replaced).

The techniques described herein further provide improvements in accuracy and speed of authentication. For example, in some implementations, the techniques of this disclosure scheme achieve a 0% false acceptance rate. In some implementations, the techniques of this disclosure scheme achieve a 7% false rejection rate, or even a 0% false rejection rate, depending on the degree of the polynomial implemented. Successful authentication can be performed in less than 100 milliseconds (ms), e.g., in about 51 ms.

Further, the techniques described herein do not aim to build a behavioral recognition system on the authentication server side. As noted above, such schemes can require a great deal of computational and storage cost to the authentication server. Using the techniques described herein, the authentication server computer can authenticate an application or device using simple and established credential authentication protocols. By integrating a fuzzy extractor server computer, in some implementations, the system requires zero to minimal changes on the authentication server while resisting client-side attacks. Moreover, the authentication server computer does not receive information about the behavior of the application or the user device, preserving privacy. This is a particularly desirable characteristic for use-cases where a service is provided by an external organization such as cloud platforms that offer services through APIs.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present disclosure can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, object-oriented or functional techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the disclosure and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A computer-implemented method comprising:
receiving, by a server computer, an authentication request comprising an application identifier associated with an application or a user device identifier associated with a user device, the authentication request originating from the user device;
receiving, by the server computer, a set of behavioral data associated with the application or the user device;
responsive to receiving the application identifier or device identifier, obtaining, by the server computer, a fuzzy vault associated with the application identifier or the user device identifier; and
determining, by the server computer, a reconstructed key value using the fuzzy vault and the set of behavioral data,
wherein the application or the user device is authenticated using the reconstructed key value, wherein the set of behavioral data is a first set of behavioral data, and wherein the method further comprises an enrollment process, the enrollment process including:
receiving, by the server computer, an enrollment request comprising the application identifier or the user device identifier and an enrollment key value;
receiving, by the server computer, a second set of behavioral data associated with the user device or the application;
forming, by the server computer, a polynomial using the enrollment key value, wherein one or more portions of the enrollment key value form coefficients of the polynomial;
determining, by the server computer, a set of genuine points by inputting the second set of behavioral data into the polynomial; and
forming the fuzzy vault using the set of genuine points and random chaff points, wherein the fuzzy vault comprises the set of genuine points and the random chaff points on a graph.

2. The method of claim 1, wherein the server computer is a fuzzy extractor server computer and wherein the fuzzy vault is stored in an authentication server computer, and the method further comprises:
generating, by the fuzzy extractor server computer, a hash of the reconstructed key value; and
transmitting, by the fuzzy extractor server computer, the hash of the reconstructed key value and the application identifier or the user device identifier to the authentication server computer, wherein the authentication server computer verifies the hash of the reconstructed key value with a hash of an enrollment key value, and wherein the authentication server computer notifies the user device that the user device or the application is authenticated.

3. The method of claim 1, wherein the set of behavioral data is obtained from a plurality of sensors in communication with or within the user device.

4. The method of claim 1, wherein the set of behavioral data includes one or more of: CPU consumption by the application or the user device, memory consumption by the application or the user device, a number of successful communications with the application or the user device, a number of files accessed by the application or the user device, a number of system calls performed by the application or the user device, an average response time of the application or the user device, a number of packets sent by the application or the user device, or a number of packets received by the application or the user device.

5. The method of claim 1, wherein the server computer is a fuzzy extractor server computer and wherein the fuzzy vault is stored in an authentication server computer, and the fuzzy extractor server computer receives the authentication request from the user device via the authentication server computer.

6. The method of claim 1, wherein determining, by the server computer, the reconstructed key value using the fuzzy vault and the set of behavioral data comprises:
using the behavioral data to identify a candidate set of points in the fuzzy vault;
forming a polynomial with the candidate set of points; and
determining the reconstructed key value using coefficients of the polynomial.

7. The method of claim 6, wherein the behavioral data includes a plurality of feature values, and using the behavioral data to identify the candidate set of points in the fuzzy vault comprises:
for each feature value of the plurality of feature values, comparing the feature value to a fuzzy vault value corresponding to a point in the fuzzy vault; and
selecting, as one of the candidate set of points, the point in the fuzzy vault if the fuzzy vault value is within a predetermined threshold of the one of the feature value.

8. The method of claim 1, further comprising:
transmitting the fuzzy vault to the user device, wherein the user device stores the fuzzy vault.

9. The method of claim 1, further comprising:
deleting, by the server computer, the enrollment key value after forming the fuzzy vault.

10. The method of claim 1, wherein the application or the user device is granted access to a computing service based on the authentication.

11. The method of claim 1, wherein the set of behavioral data comprises time series data, the method further comprising:
computing a statistical value based on the time series data for at least a subset of the behavioral data, wherein the statistical value is used to determine the reconstructed key value.

12. The method of claim 1, wherein the set of behavioral data comprises a plurality of feature values, the method further comprising:
computing a normalized value for each of the feature values; and
generating a binary feature vector based on the normalized values, wherein the binary feature vector is used to determine the reconstructed key value.

13. A server computer comprising:
a processor; and
a non-transitory computer-readable medium comprising code, executable by the processor, for implementing operations comprising:
receiving an authentication request comprising an application identifier associated with an application or a user device identifier associated with a user device, the authentication request originating from the user device;
receiving a set of behavioral data associated with the application or the user device;
responsive to receiving the application identifier or device identifier, obtaining a fuzzy vault associated with the application identifier or the user device identifier; and
determining a reconstructed key value using the fuzzy vault and the set of behavioral data,
wherein the application or the user device is authenticated using the reconstructed key value, wherein the set of behavioral data is a first set of behavioral data, and wherein the operations further comprise an enrollment process, the enrollment process including:
receiving, by the server computer, an enrollment request comprising the application identifier or the user device identifier and an enrollment key value;
receiving, by the server computer, a second set of behavioral data associated with the user device or the application;
forming, by the server computer, a polynomial using the enrollment key value, wherein one or more portions of the enrollment key value form coefficients of the polynomial;
determining, by the server computer, a set of genuine points by inputting the second set of behavioral data into the polynomial; and
forming the fuzzy vault using the set of genuine points and random chaff points, wherein the fuzzy vault comprises the set of genuine points and the random chaff points on a graph.

14. The server computer of claim 13, wherein:
the set of behavioral data is obtained from a plurality of sensors in communication with or within the user device; and
the set of behavioral data includes one or more of: CPU consumption by the application or the user device, memory consumption by the application or the user device, a number of successful communications with the application or the user device, a number of files accessed by the application or the user device, a number of system calls performed by the application or the user device, an average response time of the application or the user device, a number of packets sent by the application or the user device, or a number of packets received by the application or the user device.

15. The server computer of claim 13, wherein determining the reconstructed key value using the fuzzy vault and the set of behavioral data comprises:
using the behavioral data to identify a candidate set of points in the fuzzy vault;
forming a polynomial with the candidate set of points; and
determining the reconstructed key value using coefficients of the polynomial.

16. A computer-implemented method comprising:
transmitting, by an authentication server computer to a fuzzy extractor server computer, an authentication request for an application or a user device comprising an application identifier or a user device identifier, the authentication request originating from the user device, thereby causing computation of a reconstructed key value by the fuzzy extractor server computer using a fuzzy vault associated with the application identifier or the user device identifier and a set of behavioral data associated with the application or the user device;
receiving the reconstructed key value or a hash of the reconstructed key value; and
authenticating, by the authentication server computer, the application or the user device with the reconstructed key value or the hash of the reconstructed key value,
wherein the set of behavioral data is a first set of behavioral data, and wherein an enrollment process is performed by the fuzzy extractor server computer, the enrollment process comprising:
receiving an enrollment request comprising the application identifier or the user device identifier and an enrollment key value,
receiving a second set of behavioral data associated with the user device or the application,
forming a polynomial using the enrollment key value, wherein one or more portions of the enrollment key value form coefficients of the polynomial,
determining a set of genuine points by inputting the second set of behavioral data into the polynomial, and
forming the fuzzy vault using the set of genuine points and random chaff points, wherein the fuzzy vault comprises the set of genuine points and the random chaff points on a graph.

17. The method of claim 16, wherein authenticating the application or the user device comprises:
- comparing, by the authentication server computer, the hash of the reconstructed key value to a stored hashed key; and
- determining, by the authentication server computer, that the hash of the reconstructed key value matches the stored hashed key.

18. The method of claim 16, wherein:
- the set of behavioral data is obtained from a plurality of sensors in communication with or within the user device; and
- the set of behavioral data includes one or more of: CPU consumption by the application or the user device, memory consumption by the application or the user device, a number of successful communications with the application or the user device, a number of files accessed by the application or the user device, a number of system calls performed by the application or the user device, an average response time of the application or the user device, a number of packets sent by the application or the user device, or a number of packets received by the application or the user device.

* * * * *